United States Patent [19]

Bonora

[11] Patent Number: 5,977,218

[45] Date of Patent: *Nov. 2, 1999

[54] POLYOLEFIN OR OLEFIN COPOLYMER FILMS HAVING IMPROVED LIGHT STABILITY AND PESTICIDE RESISTANCE

[75] Inventor: Michela Bonora, Casalecchio di Reno - Bologna, Italy

[73] Assignee: Ciba Specialty Chemicals Corporation, Tarrytown, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/475,128

[22] Filed: Jun. 7, 1995

[30] Foreign Application Priority Data

Jun. 27, 1994 [IT] Italy .................................. MI94A1333

[51] Int. Cl.$^6$ ...................................... C08K 5/34
[52] U.S. Cl. .............................. 524/91; 524/99; 524/100; 524/102; 524/300; 524/414; 524/432; 524/433
[58] Field of Search ................................ 524/91, 99, 100, 524/102, 414, 432, 433, 300

[56] References Cited

U.S. PATENT DOCUMENTS

| | | | |
|---|---|---|---|
| 4,929,652 | 5/1990 | Gugumus | 524/91 |
| 5,025,051 | 6/1991 | Sato et al. | 524/99 |
| 5,096,950 | 3/1992 | Galbo et al. | 524/99 |
| 5,134,181 | 7/1992 | Masina | 524/100 |
| 5,180,762 | 1/1993 | Canova | 524/100 |

FOREIGN PATENT DOCUMENTS

| | | |
|---|---|---|
| 0290388 | 2/1989 | European Pat. Off. . |
| 0429731 | 6/1991 | European Pat. Off. . |
| 0500073 | 8/1992 | European Pat. Off. . |
| 0468923 | 1/1993 | European Pat. Off. . |
| 63-175072 | 7/1988 | Japan . |
| 2132621 | 7/1984 | United Kingdom . |

Primary Examiner—Kriellion S. Morgan
Attorney, Agent, or Firm—Kevin T. Mansfield; Luther A.R. Hall

[57] ABSTRACT

Polyolefin or polyolefin copolymer films for agricultural applications stabilized with a sterically hindered amine and a metal oxide or hydroxide selected from oxides of zinc, aluminum, calcium and magnesium, and hydroxides of zinc, aluminum and calcium, show improved light stability and pesticide resistance.

12 Claims, No Drawings

POLYOLEFIN OR OLEFIN COPOLYMER FILMS HAVING IMPROVED LIGHT STABILITY AND PESTICIDE RESISTANCE

This invention pertains to stabilized polyolefin or polyolefin copolymer films in contact with a pesticide, to a process for stabilizing polyolefin or polyolefin copolymer films for agricultural applications, to the corresponding use of a polyolefin or polyolefin copolymer film thus stabilized, and to a novel use of a stabilizer composition comprising a sterically hindered amine and a metal oxide or hydroxide selected from oxides of zinc, aluminum, calcium and magnesium, and hydroxides of zinc, aluminum and calcium.

The use of sterically hindered amines as light stabilizers for polyolefins is known. The combination of sterically hindered amines with metal carboxylates, e.g. calcium stearate, and/or metal oxides, e.g. zinc oxide, in order to attain an improved light stability has been proposed (U.S. Pat. No. 5,134,181, U.S. Pat. No. 4,929,652, U.S. Pat. No. 5,037,870, U.S. Pat. No. 5,180,762).

Attaining good stabilization of polyolefin or polyolefin copolymer films for agricultural applications is impeded by the detrimental effect of pesticides, which come in contact with the films in these applications. In order to overcome these negative effects of the application of pesticides, special stabilizer compositions have been proposed, e.g. N-hydrocarbyloxy substituted sterically hindered amines together with calcium stearate (U.S. Pat. No. 5,096,950), or conventional sterically hindered amines in combination with a hydrotalcite and optionally an UV absorber (EP-A-500 073, Chem. Abstr. 109:151118q, EP-A-429 731). The stabilization of a polyethylene film against a chlorine containing pesticide by combining a sterically hindered amine with a hydrotalcite has been reported to be better than by combining a sterically hindered amine with magnesium hydroxide.

There is still need to improve the stability of polyolefin or polyolefin copolymer films against pesticides.

It has now been found that, surprisingly, light stability and pesticide resistance of polyolefin or polyolefin copolymer films can be distinctly improved by a combination of sterically hindered amines with a metal oxide or hydroxide selected from oxides of zinc, aluminum, calcium and magnesium, and hydroxides of zinc, aluminum and calcium. Accordingly, subject of the invention is a polyolefin or polyolefin copolymer film in contact with a pesticide and stabilized against photodegradation, characterized in that the polyolefin or polyolefin copolymer contains a sterically hindered amine and a metal oxide or hydroxide selected from oxides of zinc, aluminum, calcium and magnesium, and hydroxides of zinc, aluminum and calcium. Accordingly, the invention also pertains to a composition comprising a pesticide and a polyolefin or polyolefin copolymer film stabilized with a sterically hindered amine and a metal oxide or hydroxide selected from oxides of zinc, aluminum, calcium and magnesium, and hydroxides of zinc, aluminum and calcium.

Preferably, polyolefin or polyolefin copolymer films of the invention are employed in agricultural, especially in greenhouse applications.

The pesticides which may contribute to a faster photodegradation, often are those containing halogen and/or sulfur atoms. Halogen containing pesticides usually embrace compounds containing fluorine, chlorine or bromine, especially chlorine. Compound classes, whose detrimental effects on the photostability of polyolefin or polyolefin copolymer films can be most effectively prevented by the instant invention, include pyrethroides of the permethrin and fenvalerate type, thioureas, dithiocarbamates, thio- and isothiocyanates and compounds generating these compounds, especially permethrin type compounds containing chlorine and dithiocarbamates such as derivatives of vinylidene dichloride and metal salts of alkyldithiocarbamic acid.

Said polyolefins or polyolefin copolymers are usually polymers for agricultural films. Polyolefins or polyolefin copolymers for films of the invention are mainly the materials listed below:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), low density polyethylene (LDPE), linear low density polyethylene (LLDPE), branched low density polyethylene (BLDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

Of major interest are polymers of monoolefins, especially α-monoolefins, for example polypropylene, polyisobutylene, polybut-1-ene, poly4-methylpent-1-ene, as well as polymers of cycloolefins, polyethylene (which optionally can be crosslinked), for example high density polyethylene (HDPE), low density polyethylene (LDPE), linear low density polyethylene (LLDPE), branched low density polyethylene (BLDPE), and copolymers of these monomers or with vinyl acetate. Preferred are polyethylene, ethylene/propylene copolymer, ethylene/vinyl acetate copolymer and polypropylene; especially polyethylene, which is often LDPE.

Metal oxides or hydroxides in the polyolefin or polyolefin copolymer films according the invention are mainly oxides of zinc, aluminum, calcium or magnesium, or hydroxides of zinc, aluminum or calcium, especially zinc oxide (ZnO), zinc hydroxide (Zn[OH]$_2$), ortho or meta aluminum hydroxide (Al[OH]$_3$), α- or γ-aluminum oxide (Al$_2$O$_3$), or magnesium oxide (MgO), for example ZnO, Zn(OH)$_2$ or MgO. Preferred are oxide or hydroxide of zinc; most preferred is zinc oxide.

Usually, the polyolefin or polyolefin copolymer film stabilized according the invention contains from 0.01 to 5% by weight of the sterically hindered amine and from 0.005 to 3% by weight of the metal oxide or hydroxide, relative to the weight of the polyolefin or polyolefin copolymer. Advantageous ranges for both stabilizer components are from 0.025 to 2%, especially from 0.05 to 1% by weight of the sterically hindered amine, and from 0.005 to 1%, especially from 0.025 to 0.5% by weight of the metal oxide or hydroxide, relative to the weight of the polyolefin or polyolefin copolymer.

In many cases, polyolefin or polyolefin copolymer films of the invention contain a salt of a $C_1$–$C_{30}$carboxylic acid, especially a $C_8$–$C_{22}$carboxylic acid; of utmost importance are salts of a $C_8$–$C_{18}$carboxylic acid.

Preferred is a polyolefin or polyolefin copolymer film, in which the polyolefin or polyolefin copolymer contains one or more further components selected from alkaline earth metal salts, zinc salts and aluminum salts of $C_1$–$C_{30}$carboxylic acid, hydrotalcites, and UV absorbers.

Of major interest are polyolefin or polyolefin copolymer films containing a salt of a $C_1$–$C_{30}$carboxylic acid. Metal carboxylates optionally to be added are mainly salts of Al, Ba, Ca, Mg, Sr or Zn. Preferred are salts of aluminum, calcium, magnesium or zinc, especially of $C_{12}$–$C_{18}$carboxylic acids. Most preferred are calcium salts, for example calcium stearate.

Metal carboxylates are advantageously employed in an amount from 0.05 to 2%, especially from 0.1 to 1% by weight of the polyolefin or polyolefin copolymer.

UV absorbers optionally to be added often are selected from 2-(2'-hydroxyphenyl)benzotriazoles, 2-hydroxybenzophenones, oxamides and/or 2-(2-hydroxyphenyl)-1,3,5-triazines. Preferred are 2-(2'-hydroxyphenyl)-benzotriazole UV absorbers; examples for such compounds are 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1, 1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)-benzotriazole, 2-(3',5'-bis-(α,α-dimethylbenzyl)-2'-hydroxyphenyl)benzotriazole, mixture of 2-(3'-tert-butyl-2'-hydroxy-5'-(2-octyloxycarbonylethyl) phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO(CH$_2$)$_3$⏤]$_2$, where R=3'-tert-butyl-4'-hydroxy-5'-2H-benzotriazol-2-ylphenyl.

UV absorbers are advantageously employed in an amount from 0.01 to 5%, especially from 0.05 to 2% by weight of the polyolefin or polyolefin copolymer.

Polyolefin or polyolefin copolymer films according to the invention advantageously may contain as further component a hydrotalcite.

Such hydrotalcites include compounds of formula I, $$M^{2+}{}_{1-x}\cdot M^{3+}{}_{x}\cdot (OH)_2\cdot (A^{n-})_{x/n}\cdot pH_2O \qquad (I)$$

wherein
$M^{2+}$ is Mg, Ca, Sr, Ba, Zn, Pb, Sn and/or Ni,
$M^{3+}$ is Al, B or Bi,
$A^n$ is an Anion of the valency n,
n is a number from 1 to 4,
x is a number from 0 to 0,5,
p is a number from 0 to 2 and
A is OH$^-$, Cl$^-$, Br$^-$, I$^-$, ClO$_4^-$, HCO$_3^-$, CH$_3$COO$^-$, C$_6$H$_5$COO$^-$, CO$_3^{2-}$, SO$_4^{2-}$,

(CHOHCOO)$_2^{2-}$, (CHOH)$_4$CH$_2$OHCOO$^-$, C$_2$H$_4$(COO)$_2^{2-}$, (CH$_2$COO)$_2^{2-}$, CH$_3$CHOHCOO$^-$, SiO$_3^{2-}$, SiO$_4^{4-}$, Fe(CN)$_6^{3-}$, Fe(CN)$_6^{4-}$, BO$_3^{3-}$, PO$_3^{3-}$, or HPO$_4^{2-}$.

Preferred are hydrotalcites of the above formula I, wherein $M^{2+}$ stands for Ca$^{2+}$, Mg$^{2+}$ or a mixture of Mg$^{2+}$ and Zn$^{2+}$,
$A^{n-}$ for CO$_3^{2-}$, BO$_3^{3-}$ or PO$_3^{3-}$,
x is a number from 0 to 0,5 and p is a number from 0 to 2.

Other hydrotalcites, which may be added advantageously, are compounds of formula Ia, $$M_x{}^{2+}Al_2(OH)_{2x+6nz}(A^{n-})_2\cdot pH_2O \qquad (Ia)$$

wherein in formula Ia $M^{2+}$ stands for Mg or Zn, preferably for Mg, $A^{n-}$ for an anion, e.g. an anion selected from the group consisting of $CO_3^{2-}$,

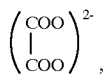

$OH^-$ and $S^{2-}$, where n is the valency of the anion, p stands for a positive number, preferably ranging from 0 to 5, for example from 0.5 to 5, and x and z are positive numbers, x ranging preferably from 2 to 6 and z being less than 2.

Most preferred are hydrotalcites corresponding to formulae Ib-Ih

| | |
|---|---|
| $Al_2O_3 \cdot 6MgO \cdot CO_2 \cdot 12 H_2O$, | (Ib) |
| $Mg_{4.5}Al_2(OH)_{13} \cdot CO_3 \cdot 3,5H_2O$, | (Ic) |
| $4MgO \cdot Al_2O_3 \cdot CO_2 \cdot 9H_2O$, | (Id) |
| $4MgO \cdot Al_2O_3 \cdot CO_2 \cdot 6H_2O$, | (Ie) |
| $ZnO \cdot 3MgO \cdot Al_2O_3 \cdot CO_2 \cdot 8-9 H_2O$, | (If) |
| $ZnO \cdot 3MgO \cdot Al_2O_3 \cdot CO_2 \cdot 5-6 H_2O$, | (Ig) |
| $Mg_{4.5}Al_2(OH)_{13} \cdot CO_3$. | (Ih) |

Hydrotalcites are advantageously employed in an amount from 0.01 to 5%, especially from 0.2 to 3% by weight of the polyolefin or polyolefin copolymer.

The sterically hindered amine can be an individual compound or a mixture of compounds. In the case of a mixture of compounds, the amounts given refer in each case to the total amount of sterically hindered amines used.

A sterically hindered amine is here to be understood as meaning in particular a compound containing one or more trivalent groups of the formula II

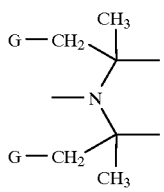

(II)

in which G is hydrogen or methyl and in which not more than one of the free valencies in formula II is saturated with hydrogen and 2 or all 3 free valencies constitute bonds to carbon or hetero atoms.

Examples for such compounds can be found in U.S. Pat. Nos. 4,086,204, 4,108,829, 4,263,434, 4,233,412, 4,288,593, 4,315,859, 4,321,374, 4,331,586, 4,413,093, 4,435,555, 4,477,615, 4,335,242, 4,376,836, 4,433,145, 4,459,395, 4,477,615, 4,533,688, 4,540,728, 4,547,548, and 4,740,544, and in the publications EP-A-22080, EP-A-29522, EP-A-24338, EP-A-42554, EP-A-44499, EP-A-70386, EP-A-72009, EP-A-75849, EP-A-82244, EP-A-94048, EP-A-107615, EP-A-402889, EP-A-357223, and DE-A-3530666; the disclosure of these documents is regarded as part of the instant specification.

In most cases, the sterically hindered amine is a cyclic sterically hindered amine, in particular a compound from the series of polyalkylpiperidine derivatives containing at least one group of the formula III

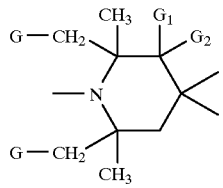

(III)

in which G is hydrogen or methyl, and $G_1$ and $G_2$ are hydrogen, methyl or together are a substituent =O; preferably the polyalkylpiperidine groups of the formula III are substituted in the 4 position by one or two polar substituents or a polar spiro ring system.

Of importance are cyclic sterically hindered amines containing at least one group of the formula III, in which G is hydrogen and $G^1$ and $G^2$ are hydrogen or together are a substituent =O.

Particularly advantageously, derivatives of 2,2,6,6-tetramethylpiperidine are employed according to the invention.

Of importance is in particular the use of the classes of polyalkylpiperidines described below under (a) to (h), which carry at least one group of the formula III, as mentioned above:

(a) compounds of the formula IV

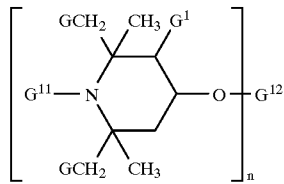

(IV)

in which n is a number from 1 to 4, G and $G^1$, independently of one another, are hydrogen or methyl, $G^{11}$ is hydrogen, $C_1$–$C_{18}$alkyl, $C_3$–$C_8$alkenyl, $C_3$–$C_8$alkynyl, $C_7$–$C_{12}$aralkyl, $C_1$–$C_8$alkanoyl, $C_3$–$C_5$alkenoyl, glycidyl or a group —$CH_2CH(OH)$—Z, in which Z is hydrogen, methyl or phenyl, $G^{11}$ being preferably H, $C_1$–$C_4$alkyl, allyl, benzyl, acetyl or acryloyl and $G^{12}$, in the case where n is 1, being hydrogen, $C_1$–$C_{18}$alkyl which may be interrupted by one or more oxygen atoms, cyanoethyl, benzyl, glycidyl, a monovalent radical of an aliphatic, cycloaliphatic, araliphatic, unsaturated or aromatic carboxylic acid, carbamic acid, or phosphorus-containing acid, or a monovalent silyl radical, preferably a radical of an aliphatic carboxylic acid having 2 to 18 C atoms, of a cycloaliphatic carboxylic acid having 7 to 15 C atoms, of an α,β-unsaturated carboxylic acid having 3 to 5 C atoms, or of an aromatic carboxylic acid having 7 to 15 C atoms, it being possible for the carboxylic acid in each case to be substituted in the aliphatic, cycloaliphatic or aromatic portion by 1 to 3 groups —$COOZ^{12}$, in which $Z^{12}$ is H, $C_1$–$C_{20}$alkyl, $C_3$–$C_{12}$alkenyl, $C_5$–$C_7$cycloalkyl, phenyl or benzyl, $G^{12}$, in the case where n is 2, being $C_2$–$C_{12}$alkylene, $C_4$–$C_{12}$alkenylene, xylylene, a divalent radical of an aliphatic, cycloaliphatic, araliphatic or aromatic dicarboxylic acid, dicarbamic acid, or phosphorus-containing acid, or a divalent silyl radical, preferably a radical of an aliphatic dicarboxylic acid having 2 to 36 C atoms, of a cycloaliphatic or aromatic dicarboxylic acid having 8–14 C atoms, or of an aliphatic, cycloaliphatic or aromatic dicarbamic acid having 8–14 C atoms, it being possible for the dicarboxylic acid in each case to be substituted in the aliphatic, cycloaliphatic or aromatic moiety by 1 or 2 groups —COOZ$^{12}$, G$^{12}$, in the case where n is 3, being a trivalent radical of an aliphatic, cycloaliphatic or aromatic tricarboxylic acid, which may be substituted in the aliphatic, cycloaliphatic or aromatic moiety by —COOZ$^{12}$, of an aromatic tricarbamic acid, or of a phosphorus-containing acid, or a trivalent silyl radical, and G$^{12}$, in the case where n is 4, being a tetravalent radical of an aliphatic, cycloaliphatic or aromatic tetracarboxylic acid.

The carboxylic acid radicals given include in each case radicals of the formula (—CO)$_n$R, the meaning of n being given above and the meaning of R being apparent from the definition given.

Any C$_1$–C$_{12}$alkyl substituents present are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Examples of G$^{11}$ or G$^{12}$ as C$_1$–C$_{18}$alkyl can be the groups listed above and in addition, for example, n-tridecyl, n-tetradecyl, n-hexadecyl or n-octadecyl.

Examples of G$^{11}$ as C$_3$–C$_8$alkenyl can be 1-propenyl, allyl, methallyl, 2-butenyl, 2-pentenyl, 2-hexenyl, 2-octenyl, 4-tert-butyl-2-butenyl.

G$^{11}$ as C$_3$–C$_8$alkynyl is preferably propargyl.

G$^{11}$ as C$_7$–C$_{12}$aralayl is in particular phenethyl and especially benzyl.

Examples of G$^{11}$ as C$_1$–C$_8$alkanoyl are formyl, propionyl, butyryl, octanoyl, but preferably acetyl and as C$_3$–C$_5$alkenoyl in particular acryloyl.

G$^{12}$ as a monovalent radical of a carboxylic acid is, for example, an acetic acid, caproic acid, stearic acid, acrylic acid, methacrylic acid, benzoic acid or β-(3,5-di-tert-butyl-4-hydroxyphenyl)propionic acid radical.

G$^{12}$ as a monovalent silyl radical is, for example, a radical of the formula —(C$_j$H$_{2j}$)—Si(Z')$_2$Z", in which j is an integer from the range 2 to 5, and Z' and Z", independently of one another, are C$_1$–C$_4$alkyl or C$_1$–C$_4$alkoxy.

G$^{12}$ as a divalent radical of a dicarboxylic acid is, for example, a malonic acid, succinic acid, glutaric acid, adipic acid, suberic acid, sebacic acid, maleic acid, itaconic acid, phthalic acid, dibutylmalonic acid, dibenzylmalonic acid, butyl(3,5-di-tert-butyl-4-hydroxybenzyl)malonic acid or bicycloheptenedicarboxylic acid radical.

G$^{12}$ as a trivalent radical of a tricarboxylic acid is, for example, a trimellitic acid, citric acid or nitrilotriacetic acid radical.

G$^{12}$ as a tetravalent radical of a tetracarboxylic acid is, for example, the tetravalent radical of butane-1,2,3,4-tetracarboxylic acid or of pyromellitic acid.

G$^{12}$ as a divalent radical of a dicarbamic acid is, for example, a hexamethylenedicarbamic acid or a 2,4-toluylenedicarbamic acid radical Preference is given to compounds of the formula IV in which G is hydrogen, G$^{11}$ is hydrogen or methyl, n is 2, and G$^{12}$ is the diacyl radical of an aliphatic dicarboxylic acid having 4–12 C atoms.

Examples of polyalkylpiperidine compounds of this class are the following compounds:
1) 4-hydroxy-2,2,6,6-tetramethylpiperidine
2) 1-allyl-4-hydroxy-2,2,6,6-tetramethylpiperidine
3) 1-benzyl-4-hydroxy-2,2,6,6-tetramethylpiperidine
4) 1-(4-tert-butyl-2-butenyl)-4-hydroxy-2,2,6,6-tetramethylpiperidine
5) 4-stearoyloxy-2,2,6,6-tetramethylpiperidine
6) 1-ethyl-4-salicyloyloxy-2,2,6,6-tetramethylpiperidine
7) 4-methacryloyloxy-1,2,2,6,6-pentamethylpiperidine
8) 1,2,2,6,6-pentamethylpiperidin-4-yl-β-(3,5-di-tert-butyl-4-hydroxyphenyl)propionate
9) di(1-benzyl-2,2,6,6-tetramethylpiperidin-4-yl) maleate
10) di(2,2,6,6-tetramethylpiperidin-4-yl) succinate
11) di(2,2,6,6-tetramethylpiperidin-4-yl) glutarate
12) di(2,2,6,6-tetramethylpiperidin-4-yl) adipate
13) di(2,2,6,6-tetramethylpiperidin-4-yl) sebacate
14) di(1,2,2,6,6-pentamethylpiperidin-4-yl) sebacate
15) di(1,2,3,6-tetramethyl-2,6-diethylpiperidin-4-yl) sebacate
16) di(1-allyl-2,2,6,6-tetramethylpiperidin-4-yl) phthalate
18) 1-acetyl-2,2,6,6-tetramethylpiperidin-4-yl acetate
19) trimellitic acid tri(2,2,6,6-tetramethylpiperidin-4-yl) ester
20) 1-acryloyl-4-benzyloxy-2,2,6,6-tetramethylpiperidine
21) di(2,2,6,6-tetramethylpiperidin-4-yl) diethylmalonate
22) di(1,2,2,6,6-pentamethylpiperidin-4-yl) dibutylmalonate
23) di(1,2,2,6,6-pentamethylpiperidin-4-yl) butyl(3,5-di-tert-butyl-4-hydroxybenzyl) malonate
26) hexane-1',6'-bis(4-carbamoyloxy-1-n-butyl-2,2,6,6-tetramethylpiperidine)
27) toluene-2',4'-bis(4-carbamoyloxy-1-n-propyl-2,2,6,6-tetramethylpiperidine)
28) dimethyl-bis(2,2,6,6-tetramethylpiperidin-4-oxy)silane
29) phenyl-tris(2,2,6,6-tetramethylpiperidin-4-oxy)silane
30) tris(1-propyl-2,2,6,6-tetramethylpiperidin-4-yl) phosphite
31) tris(1-propyl-2,2,6,6-tetramethylpiperidin-4-yl) phosphate
32) bis(1,2,2,6,6-pentamethylpiperidin4-yl) phenylphosphonate
33) 4-hydroxy-1,2,2,6,6-pentamethylpiperidine
34) 4-hydroxy-N-hydroxyethyl-2,2,6,6-tetramethylpiperidine
35) 4hydroxy-N-(2-hydroxypropyl)-2,2,6,6-tetramethylpiperidine
36) 1-glycidyl-4-hydroxy-2,2,6,6-tetramethylpiperidine
(b) compounds of the formula (V)

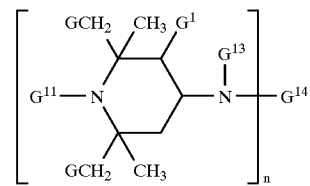

in which n is 1 or 2, G, G$^1$ and G$^{11}$ are as defined under (a), G$^{13}$ is hydrogen, C$_1$–C$_{12}$alkyl, C$_{2-C5}$hydroxyalkyl, C$_5$–C$_7$cycloalkyl, C$_7$–C$_8$aralkyl, C$_2$–C$_{18}$alkanoyl, C$_3$–C$_5$alkenoyl, benzoyl or a group of the formula

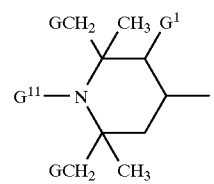

and

G$^{14}$, in the case where n is 1, is hydrogen, C$_1$–C$_{18}$alkyl, C$_3$–C$_8$alkenyl, C$_5$–C$_7$cycloalkyl, C$_1$–C$_4$alkyl which is substituted by a hydroxyl, cyano, alkoxycarbonyl or carbamide group, or is glycidyl, a group of the formula —CH₂—CH(OH)—Z or of the formula —CONH—Z, in which Z is hydrogen, methyl or phenyl; $G^{14}$, in the case where n is 2, $C_2$–$C_{12}$alkylene, $C_6$–$C_{12}$arylene, xylylene, a —CH₂—CH(OH)—CH₂— group or a group —CH₂—CH(OH)—CH₂—O—D—O—, in which D is $C_2$–$C_{10}$alkylene, $C_6$–$C_{15}$arylene, $C_6$–$C_{12}$cycloalkylene, or, provided $G^{13}$ is not alkanoyl, alkenoyl or benzoyl, $G^{14}$ can also be 1-oxo-$C_2$–$C_{12}$alkylene, a divalent radical of an aliphatic, cycloaliphatic or aromatic dicarboxylic acid or dicarbamic acid or also the group —CO—, or, in the case where n is 1, $G^{13}$ and $G^{14}$ together can also be the divalent radical of an aliphatic, cycloaliphatic or aromatic 1,2- or 1,3-dicarboxylic acid.

Aryl stands for an aromatic hydrocarbon residue such as, for example, phenyl or naphthyl. Aralkyl means alkyl which is substituted by an aromatic hydrocarbon residue, e.g. a hydrocarbon residue having 6 to 10 carbon atoms; examples for aralkyl include benzyl and α-methylbenzyl.

Any $C_1$–$C_{12}$alkyl or $C_1$–$C_{18}$alkyl substituents present are already as defined under (a).

Any $C_5$–$C_7$cycloalkyl substituents present are in particular cyclohexyl.

$G^{13}$ as $C_7$–$C_8$aralkyl is in particular phenylethyl or especially benzyl. $G^{13}$ as $C_2$–$C_5$hydroxyalkyl is in particular 2-hydroxyethyl or 2-hydroxypropyl.

Examples of $G^{13}$ as $C_{2-C18}$alkanoyl are propionyl, butyryl, octanoyl, dodecanoyl, hexadecanoyl, octadecanoyl, but preferably acetyl and, as $C_3$–$C_5$alkenoyl, in particular acryloyl.

Examples of $G^{14}$ as $C_2$–$C_8$alkenyl are allyl, methallyl, 2-butenyl, 2-pentenyl, 2-hexenyl or 2-octenyl.

Examples of $G^{14}$ as $C_1$–$C_4$alkyl substituted by a hydroxyl, cyano, alkoxycarbonyl or carbamide group can be 2-hydroxyethyl, 2-hydroxypropyl, 2-cyanoethyl, methoxycarbonylmethyl, 2-ethoxycarbonylethyl, 2-aminocarbonylpropyl or 2-(dimethylaminocarbonyl)ethyl.

Any $C_2$–$C_{12}$alkylene substituents present are, for example, ethylene, propylene, 2,2-dimethylpropylene, tetramethylene, hexamethylene, octamethylene, decamethylene or dodecamethylene.

Any $C_6$–$C_{15}$arylene substituents present are, for example, o-, m- or p-phenylene, 1,4-naphthylene or 4,4'-diphenylene.

A $C_6$–$C_{12}$cycloalkylene is in particular cyclohexylene.

Preference is given to compounds of the formula V in which n is 1 or 2, G is hydrogen, $G^{11}$ is hydrogen or methyl, $G^{13}$ is hydrogen, $C_1$–$C_{12}$alkyl or a group of the formula

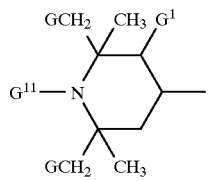

and $G^{14}$, in the case where n is 1, is hydrogen or $C_1$–$C_{12}$alkyl, and, in the case where n is 2, is $C_2$–$C_8$alkylene or 1-oxo-$C_2$–$C_8$alkylene.

Examples of polyalkylpiperidine compounds of this class are the following compounds:
37) N,N'-bis(2,2,6,6-tetramethylpiperidin4-yl) hexamethylene-1,6-diamine
38) N,N'-bis(2,2,6,6-tetramethylpiperidin4-yl) hexamethylene-1,6-diacetamide
39) bis(2,2,6,6-tetramethylpiperidin4-yl)amine
40) 4-benzoylamino-2,2,6,6-tetramethylpiperidine
41) N,N'-bis(2,2,6,6-tetramethylpiperidin-4-yl)-N,N'-dibutyladipamide
42) N,N'-bis(2,2,6,6-tetramethylpiperidin-4-yl)-N,N'-dicyclohexyl-2-hydroxypropylene-1,3-diamine
43) N,N'-bis(2,2,6,6-tetramethylpiperidin-4-yl)-p-xylylenediamine
44) N,N'-bis(2,2,6,6-tetramethylpiperidin-4-yl) succinediamide
45) di(2,2,6,6-tetramethylpiperidin-4-yl) N-(2,2,6,6-tetramethylpiperidin-4-yl)-β-aminodipropionate
46) the compound of the formula

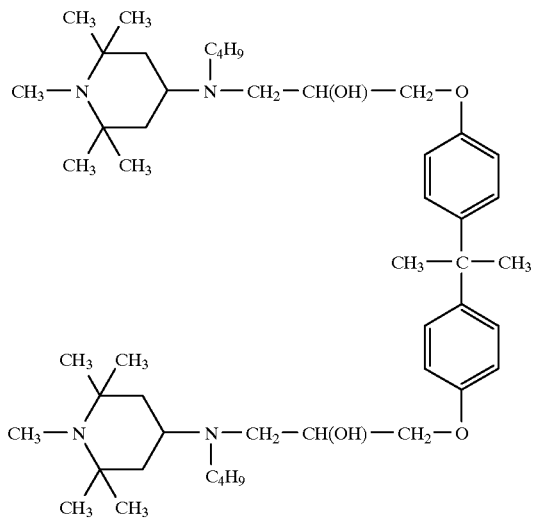

47) 4-[bis(2-hydroxyethyl)amino]-1,2,2,6,6-pentamethylpiperidine
48) 4-(3-methyl-4-hydroxy-5-tert-butylbenzamido)-2,2,6,6-tetramethylpiperidine
49) 4-methacrylamido-1,2,2,6,6-pentamethylpiperidine
(c) compounds of the formula (VI)

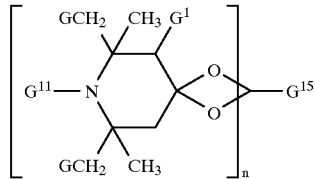

(VI)

in which n is 1 or 2, G, $G^1$ and $G^{11}$ are as defined under (a), and $G^{15}$, in the case where n is 1, is $C_2$–$C_8$alkylene or -hydroxyalkylene or $C_4$–$C_{22}$acyloxyalkylene, and, in the case where n is 2, the group (—CH₂)₂C(CH₂—)₂.

Examples of $G^{15}$ as $C_2$–$C_8$alkylene or -hydroxyalkylene are ethylene, 1-methylethylene, propylene, 2-ethylpropylene or 2-ethyl-2-hydroxymethylpropylene.

An example of $G^{15}$ as $C_4$–$C_{22}$acyloxyalkylene is 2-ethyl-2-acetoxymethylpropylene.

Examples of polyalkylpiperidine compounds of this class are the following compounds:
50) 9-aza-8,8,10,10-tetramethyl-1,5-dioxaspiro[5.5] undecane
51) 9-aza-8,8,10,10-tetramethyl-3-ethyl-1,5-dioxaspiro[5.5] undecane
52) 8-aza-2,7,7,8,9,9-hexamethyl-1,4-dioxaspiro[4.5] decane
53) 9-aza-3-hydroxymethyl-3-ethyl-8,8,9,10,10-pentamethyl-1,5-dioxaspiro[5.5]undecane 54) 9-aza-3-ethyl-3-acetoxymethyl-9-acetyl-8,8,10,10-tetramethyl-1,5-dioxaspiro[5.5]-undecane
55) 2,2,6,6-tetramethylpiperidine-4-spiro-2'-(1',3'-dioxane)-5'-spiro-5"-(1",3"-dioxane)-2"-spiro-4"'-(2"',2"',6"',6"'-tetramethylpiperidine).

(d) Compounds of the formulae VIIA, VIIB and VIIC, compounds of the formula VIIC being preferred,

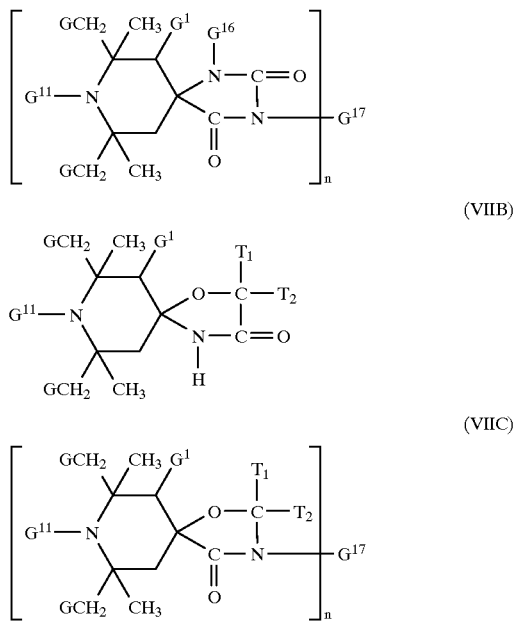

in which n is 1 or 2, G, $G^1$ and $G^{11}$ are as defined under (a), $G^{16}$ is hydrogen, $C_1$–$C_{12}$alkyl, allyl, benzyl, glycidyl or $C_2$–$C_6$alkoxyalkyl and $G^{17}$, in the case where n is 1, is hydrogen, $C_1$–$C_{12}$alkyl, $C_3$–$C_5$alkenyl, $C_7$–$C_9$aralkyl, $C_5$–$C_7$cycloalkyl, $C_2$–$C_4$hydroxyalkyl, $C_2$–$C_6$alkoxyalkyl, $C_6$–$C_{10}$aryl, glycidyl or a group of the formula —(CH$_2$)p—COO—Q or of the formula —(CH$_2$)p—O—CO—Q, in which p is 1 or 2 and Q is $C_1$–$C_4$alkyl or phenyl, $G^{17}$, in the case where n is 2, is $C_2$–$C_{12}$alkylene, $C_4$–$C_{12}$alkenylene, $C_6$–$C_{12}$ arylene, a group —CH$_2$—CH(OH)—CH$_2$—O—D—O—CH$_2$—CH(OH)—CH$_2$—, in which D is $C_2$–$C_{10}$alkylene, $C_6$–$C_{15}$arylene, $C_6$–$C_{12}$ cycloalkylene, or a group —CH$_2$CH(OZ')CH$_2$—(OCH$_2$—CH(OZ')CH$_2$)$_2$—, in which Z' is hydrogen, $C_1$–$C_{18}$alkyl, allyl, benzyl, $C_2$–$C_{12}$alkanoyl or benzoyl, $T_1$ and $T_2$, independently of one another, are hydrogen, $C_1$–$C_{18}$alkyl or $C_6$–$C_{10}$aryl or $C_7$–$C_9$aralkyl, each of which is unsubstituted or substituted by halogen or $C_1$–$C_4$alkyl, or $T_1$ and $T_2$ together with the C atom linking them form a $C_5$–$C_{14}$cycloalkane ring.

Any $C_1$–$C_{12}$alkyl substituents present are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any $C_1$–$C_{18}$allyl substituents present can be, for example, the groups listed above and in addition, for example, n-tridecyl, n-tetradecyl, n-hexadecyl or n-octadecyl.

Any $C_2$–$C_6$alkoxyalkyl substituents present are, for example, methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

Examples of $G^{17}$ as $C_3$–$C_5$alkenyl are 1-propenyl, allyl, methallyl, 2-butenyl or 2-pentenyl.

$G^{17}$, $T_1$ and $T_2$ as $C_7$–$C_9$aralkyl are in particular phenethyl or especially benzyl. A cycloalkane ring formed by $T_1$ and $T_2$ together with the C atom can be, for example, a cyclopentane, cyclohexane, cyclooctane or cyclododecane ring.

Examples of $G^{17}$ as $C_2$–$C_4$hydroxyalkyl are 2-hydroxyethyl, 2-hydroxypropyl, 2-hydroxybutyl or 4-hydroxybutyl.

$G^{17}$, $T_1$ and $T_2$ as $C_6$–$C_{10}$aryl are in particular phenyl, α- or β-naphthyl, each of which is unsubstituted or substituted by halogen or $C_1$–$C_4$alkyl.

Examples of $G^{17}$ as $C_2$–$C_{12}$alkylene are ethylene, propylene, 2,2-dimethylpropylene, tetramethylene, hexamethylene, octamethylene, decamethylene or dodecamethylene.

$G^{17}$ as $C_4$–$C_{12}$alkenylene is in particular 2-butenylene, 2-pentenylene or 3-hexenylene.

Examples of $G^{17}$ as $C_6$–$C_{12}$arylene are o-, m- or p-phenylene, 1,4-naphthylene or 4,4'-diphenylene.

Examples of Z' as $C_2$–$C_{12}$alkanoyl are propionyl, butyryl, octanoyl, dodecanoyl, but preferably acetyl.

D as $C_2$–$C_{10}$alkylene, $C_6$–$C_{15}$arylene or $C_6$–$C_{12}$cycloalkylene is as defined under (b).

Examples of polyalkylpiperidine compounds of this class are the following compounds:

56) 3-benzyl-1,3,8-triaza-7,7,9,9-tetramethylspiro[4.5]decane-2,4-dione
57) 3-n-octyl-1,3,8-triaza-7,7,9,9-tetramethylspiro[4.5]decane-2,4-dione
58) 3-allyl-1,3,8-triaza-1,7,7,9,9-pentamethylspiro[4.5]decane-2,4-dione
59) 3-glycidyl-1,3,8-triaza-7,7,8,9,9-pentamethylspiro[4.5]decane-2,4-dione
60) 1,3,7,7,8,9,9-heptamethyl-1,3,8-triazaspiro[4.5]decane-2,4-dione
61) 2-isopropyl-7,7,9,9-tetramethyl-1-oxa-3,8-diaza-4-oxospiro-[4.5]decane
62) 2,2-dibutyl-7,7,9,9-tetramethyl-1-oxa-3,8-diaza-4-oxospiro-[4.5]decane
63) 2,2,4,4-tetramethyl-7-oxa-3,20-diaza-21-oxodispiro[5.1.11.2]heneicosane
64) 2-butyl-7,7,9,9-tetramethyl-1-oxa-4,8-diaza-3-oxospiro[4.5]decane and preferably:
65) 8-acetyl-3-dodecyl-1,3,8-triaza-7,7,9,9-tetramethylspiro[4.5]decane-2,4-dione or the compounds of the following formulae:

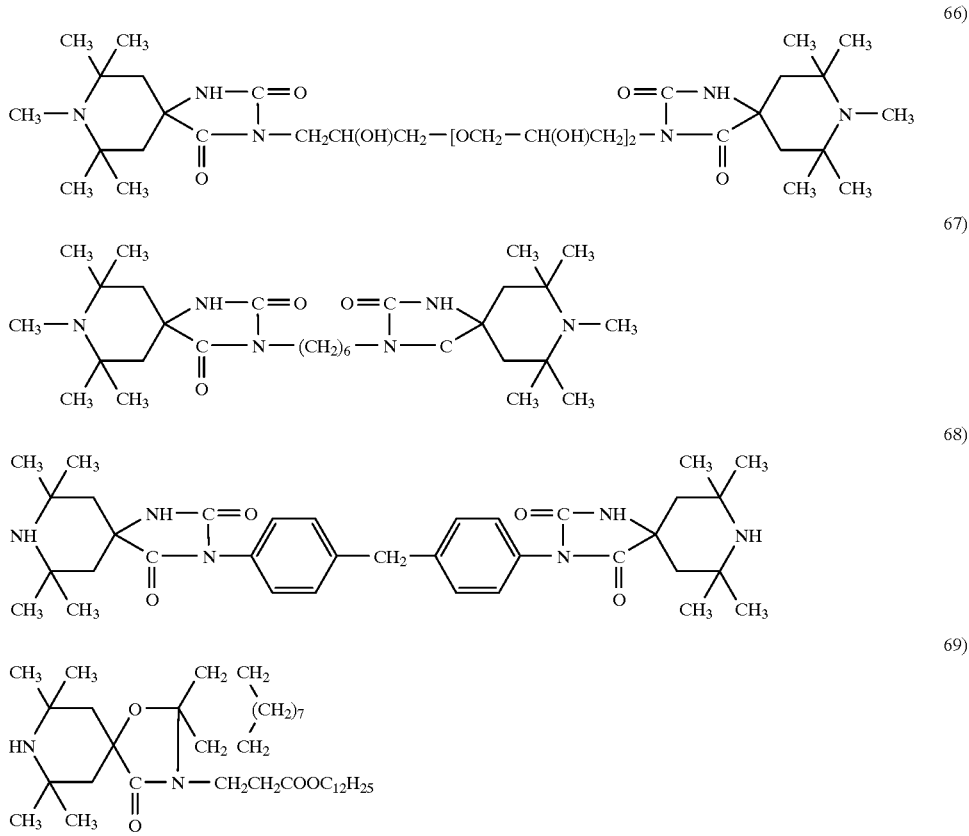

(e) compounds of the formula VIII, which on their part are preferred,

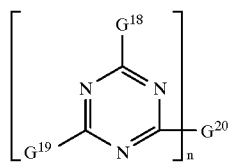
(VIII)

in which n is 1 or 2 and $G^{18}$ is a group of one of the formulae

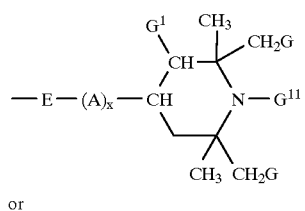

or

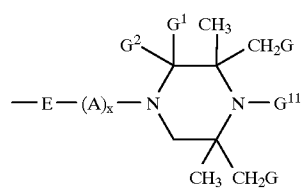

in which G and $G^{11}$ are as defined under (a) and $G^1$ and $G^2$ are hydrogen, methyl or together are a substituent =O, E is —O— or —$NG^{13}$—, A is $C_2$–$C_6$alkylene or —$(CH_2)_3$—O— and x is 0 or 1, $G^{13}$ is hydrogen, $C_1$–$C_{12}$alkyl, $C_2$–$C_5$hydroxyalkyl or $C_5$–$C_7$cycloalkyl, $G^{19}$ is identical to $G^{18}$ or one of the groups —$NG^{21}G^{22}$, —$OG^{23}$, —$NHCH_2OG^{23}$ or —$N(CH_2OG^{23})_2$, $G^{20}$, in the case where n is 1, is identical to $G^{18}$ or $G^{19}$ and, if n is 2, is a group —E—B—E—, in which B is $C_2$–$C_8$alkylene or $C_2$–$C_8$alkylene which is interrupted by 1 or 2 groups —$N(G^{21})$—, $G^{21}$ is $C_1$–$C_{12}$alkyl, cyclohexyl, benzyl or $C_1$–$C_4$hydroxyalkyl or a group of the formula

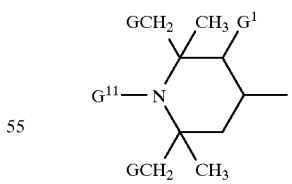

$G^{22}$ is $C_1$–$C_{12}$alkyl, cyclohexyl, benzyl, $C_1$–$C_4$hydroxyalkyl, and $G^{23}$ is hydrogen, $C_1$–$C_2$alkyl or phenyl, or $G^{21}$ and $G^{22}$ together are $C_4$–$C_5$alkylene or -oxaalkylene, for example

—CH₂CH₂\
           \>O,\
—CH₂CH₂/ or a group of the formula or

—CH₂CH₂\
           \>N—G¹¹\
—CH₂CH₂/

$G^{21}$ is a group of the formula

[Structure showing a tetramethylpiperidine–triazine–tetramethylpiperidine compound with G¹¹ substituents, C₄H₉ groups on nitrogens, and a methyl on the triazine]

Any $C_1$–$C_{12}$alkyl substituents present are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any $C_1$–$C_4$hydroxyalkyl substituents present are, for example, 2-hydroxyethyl, 2-hydroxypropyl, 3-hydroxypropyl, 2-hydroxybutyl or 4-hydroxybutyl.

Examples of A as $C_2$–$C_6$alkylene are ethylene, propylene, 2,2-dimethylpropylene, tetramethylene or hexamethylene.

Examples of $G^{21}$ and $G^{22}$ together as $C_4$–$C_5$alkylene or -oxaalkylene are tetramethylene, pentamethylene or 3-oxapentamethylene.

Examples of polyalkylpiperidine compounds of this class are the compounds of the following formulae:

70)

[Structure of compound 70: 1,2,2,6,6-pentamethylpiperidin-4-yl group linked via N(C₄H₉) to a triazine bearing two N(CH₂CH₃)₂ groups]

71)

[Structure of compound 71: bis(1-ethyl-2,2,6,6-tetramethylpiperidin-4-yl)amino-triazine with N(C₄H₉)₂ substituent and C₂H₅ groups on the bridging nitrogens]

72)

[Structure of compound 72: triazine with three R substituents, where R = —NH—CH₂CH₂CH₂—O—(1,2,2,6,6-pentamethylpiperidin-4-yl)]

where R = —NH—CH₂CH₂CH₂—O—[1,2,2,6,6-pentamethylpiperidin-4-yl]

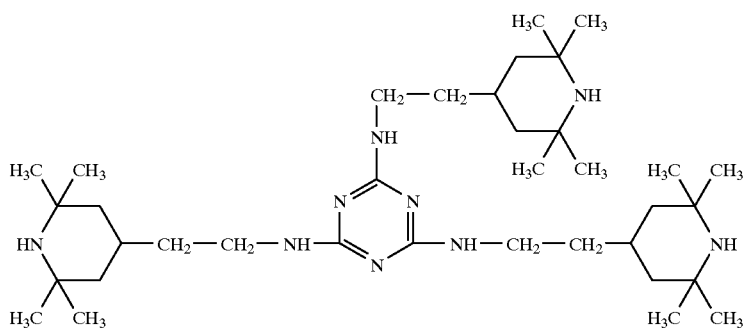
73)
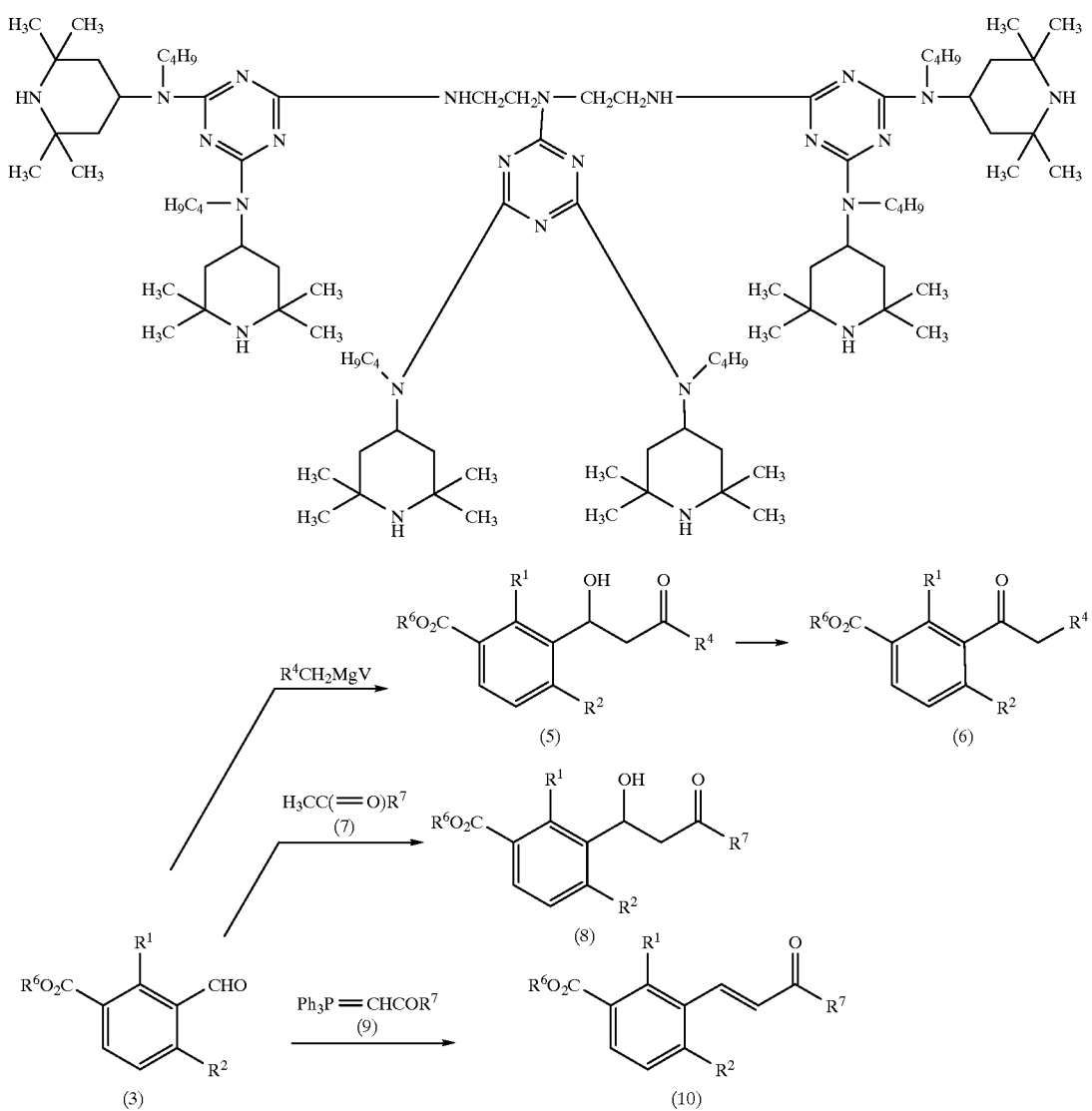
74)

-continued
75)
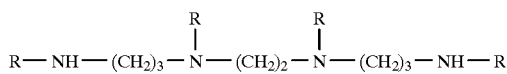
where R is 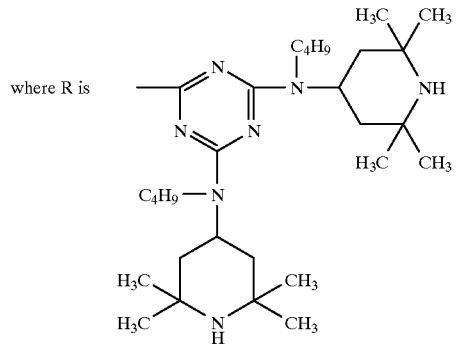
76)
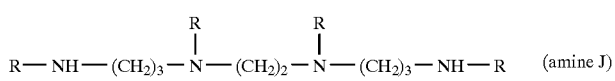 (amine J)
where R is 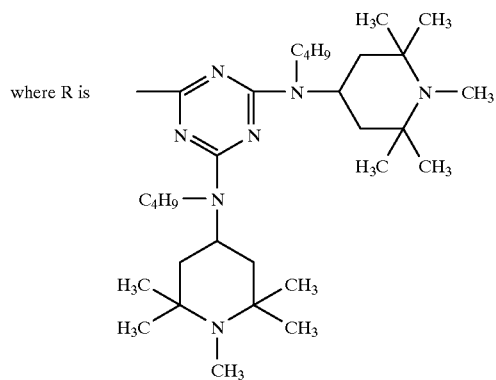
77)
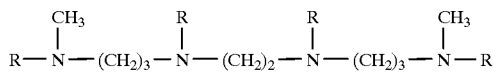
where R is 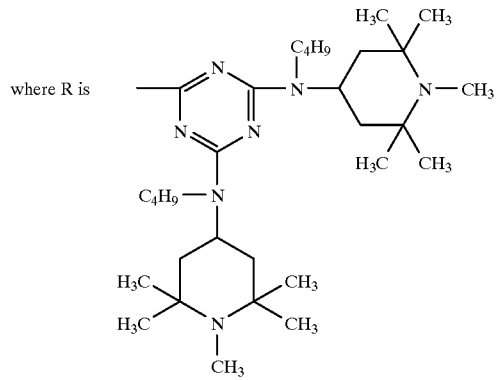

78)

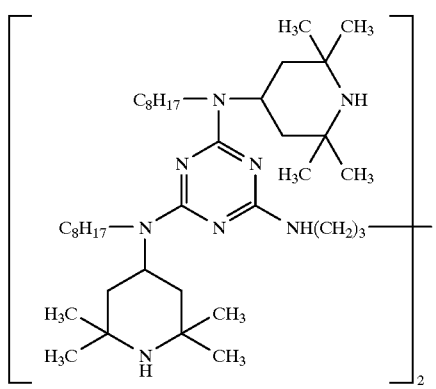

79)

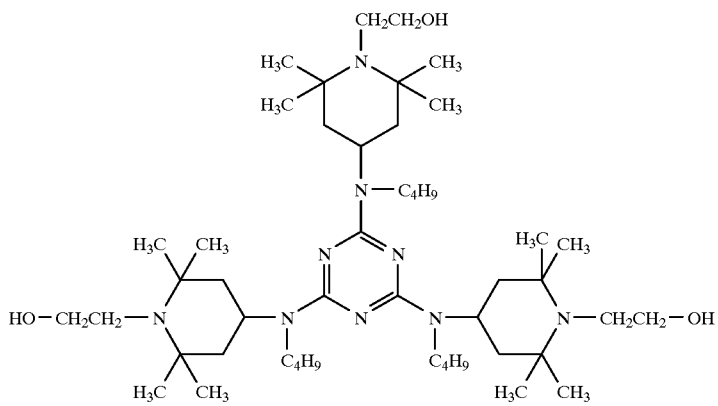

80)

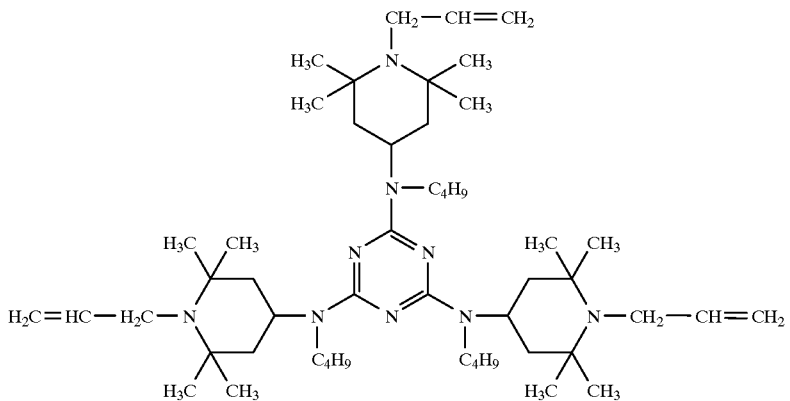

(f) oligomer or polymer compounds whose recurring structural unit contains a 2,2,6,6-tetraalkylpiperidine radical of the formula III, in particular polyesters, polyethers, polyamides, polyamines, polyurethanes, polyureas, polyaminotriazines, poly(meth)acrylates, poly(meth)acrylamides and copolymers thereof containing such radicals.

Examples of 2,2,6,6-polyalkylpiperidine light stabilizers of this class are the compounds of the following formulae, m being a number from 2 to about 200.

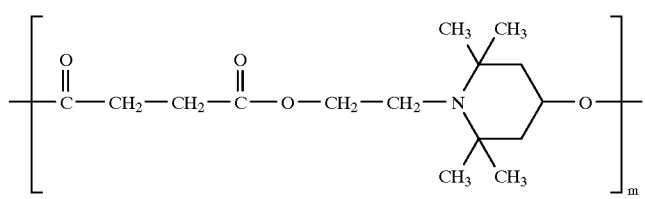
81)
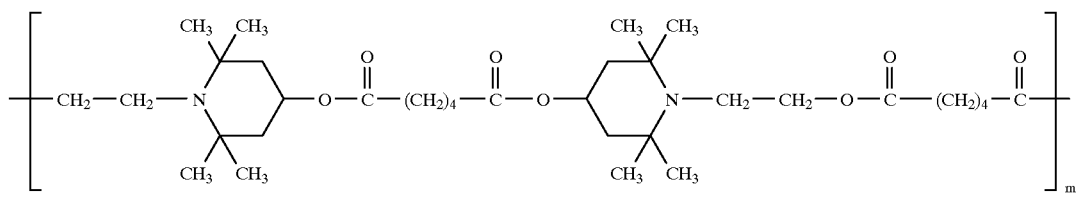
82)
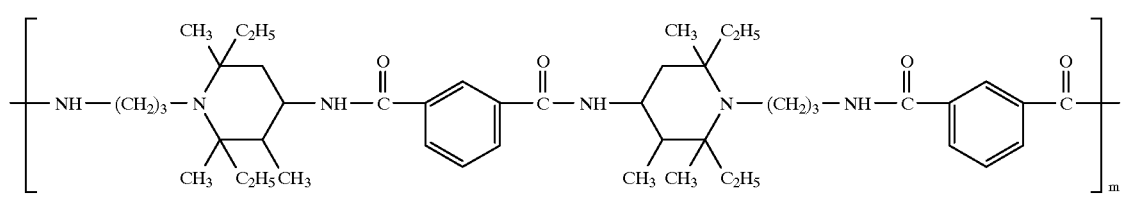
83)
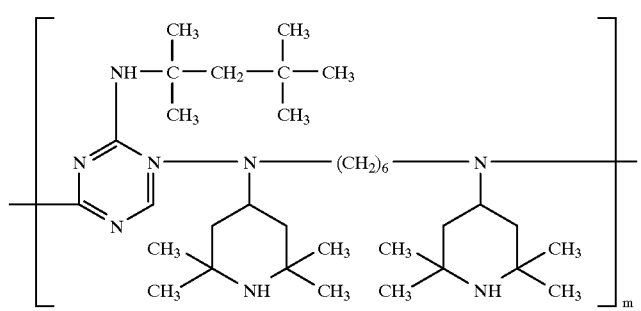
84)
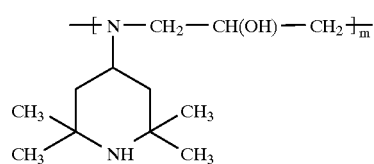
85)
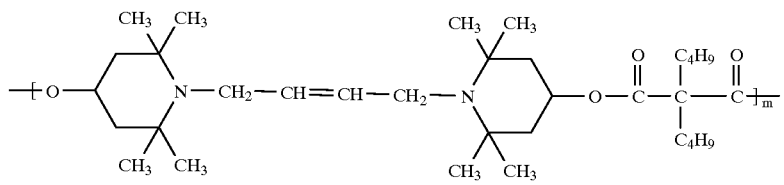
86)

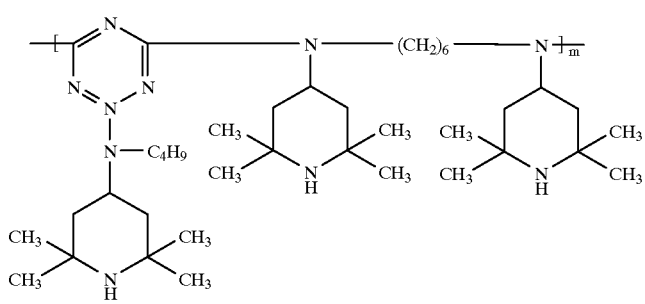
87)
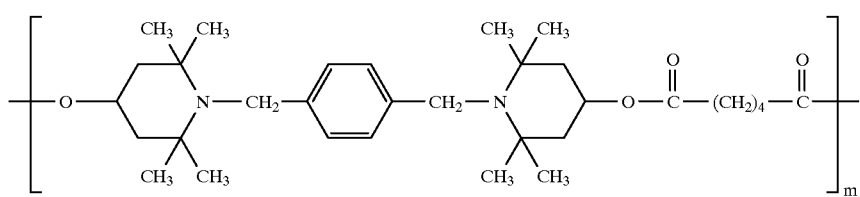
88)
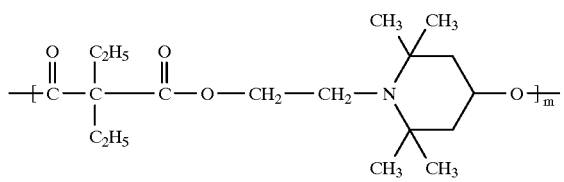
89)
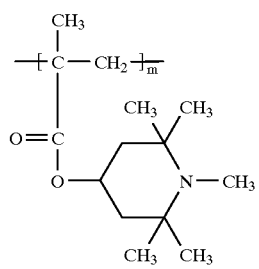
90)
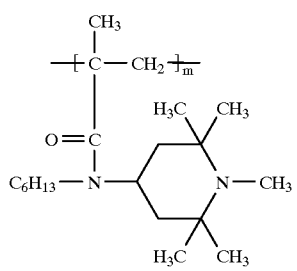
91)

-continued
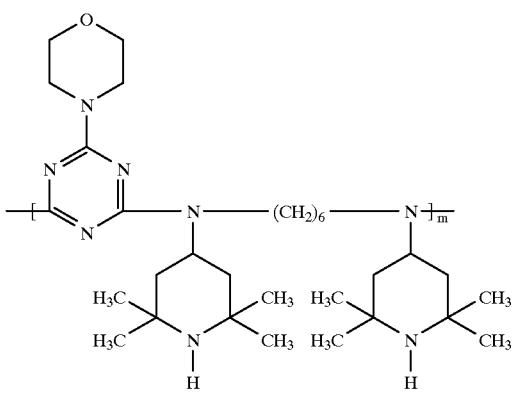
92)
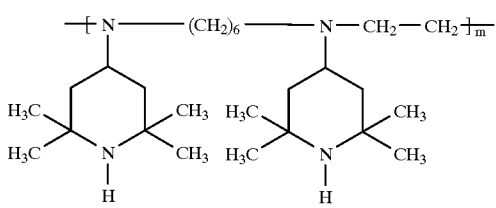
93)
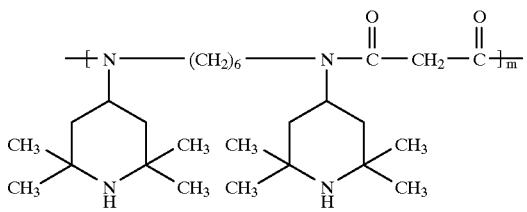
94)
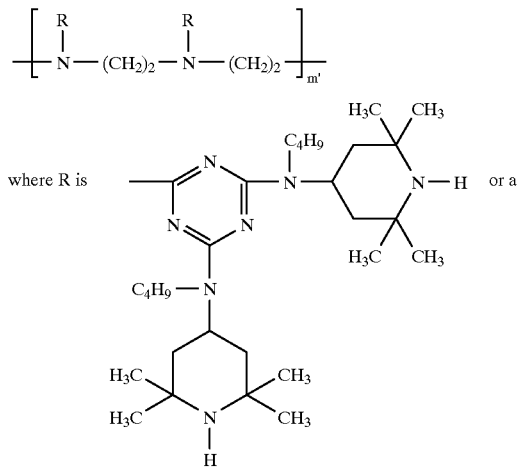
95)
branching of the chain
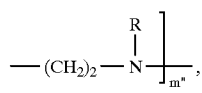,
m' and m" are each an integer from the range 0–200, on condition that m'+m" is m.
Further examples of polymer light stabilizers are reaction products of compounds of the formula

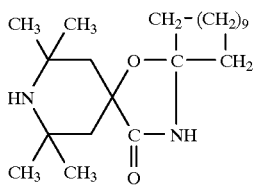

with epichlorohydrin; polyesters obtained from butane-1,2,3,4-tetracarboxylic acid with a bifunctional alcohol of the formula

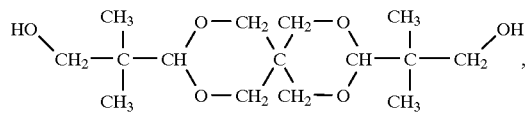

whose carboxyl side chains originating from the tetracarboxylic acid have been esterified with 2,2,6,6-tetramethyl-4-hydroxypiperidine;
compounds of the formula

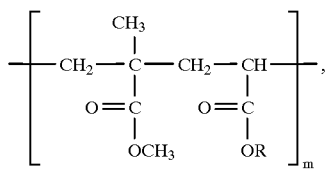

about one third of the radicals R
being —$C_2H_5$ and the others being

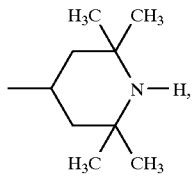

and m being a number from the range 2 to 200; or copolymers whose recurring unit consists of 2 unit

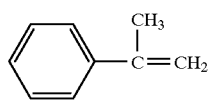

and 1 unit each

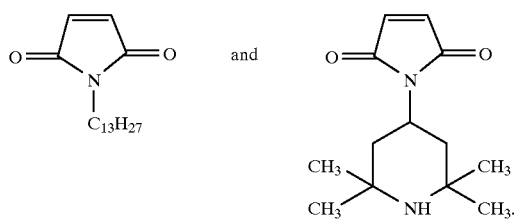

(g) compounds of the formula IX

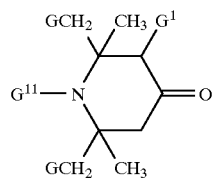

in which G, $G^1$ and $G^{11}$ are as defined under (a).

Preference is given to compounds of the formula IX in which G is hydrogen or methyl and $G^{11}$ is hydrogen or methyl.

Examples of such compounds are:

96) 2,2,6,6-tetramethyl-4-piperidone (triacetoneamine)
97) 1,2,2,6,6-pentamethyl-4-piperidone
98) 2,3,6-trimethyl-2,6-diethyl-4-piperidone (h) compounds of the formula X

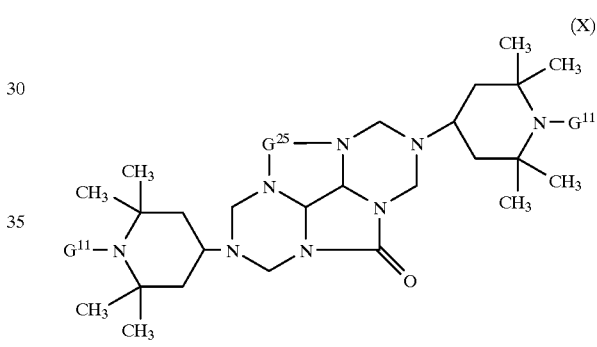

in which $G^{11}$ is as defined under (a) and $G^{25}$ is a direct bond, methylene or preferably carbonyl, as disclosed in DE-A-3530666;

Particular preference for use in the composition according to the invention is given to the following amines:

Compounds of the formula IV in which n is an integer from the range 1 to 4, G and $G^1$ are hydrogen, and $G^{11}$ is hydrogen or $C_1$–$C_{18}$alkyl, and $G^{12}$, in the case where n is 1, is a radical of the formula —$(C_jH_{2j})$—Si$(Z')_2Z''$, in which j is an integer from the range 2 to 5 and $Z'$ and $Z''$, independently of one another, are $C_1$–$C_4$alkyl or $C_1$–$C_4$alkoxy, and $G^{12}$, in the case where n is 2, is a radical of an aliphatic dicarboxylic acid having 2 to 12 C atoms which may be substituted by —COO$Z^{12}$, $Z^{12}$ being $C_1$–$C_{20}$alkyl, $G^{12}$, in the case where n is 3, is a radical of an aromatic tricarboxylic acid having 9 to 15 C atoms, $G^{12}$, in the case where n is 4, is a radical of an aliphatic tetracarboxylic acid having 8 to 12 C atoms; amines from this class which are of particular technical interest are those of the formulae

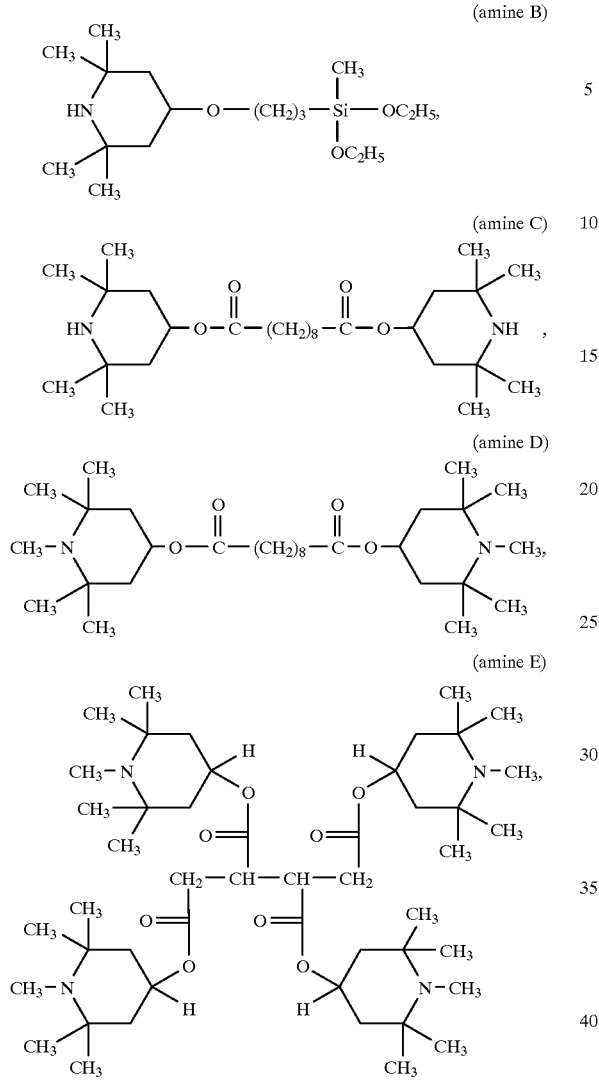

(amine B)
(amine C)
(amine D)
(amine E)

and
esters of butane-1,2,3,4-tetracarboxylic acid containing 2 units each of 1,2,2,6,6-penta-methyl-4-hydroxy-piperidine and $C_{13}H_{27}$—OH (amine F);
compounds of the formula V in which n is 2, G and $G^1$ are hydrogen,
$G^{11}$ is hydrogen or methyl and
$G^{13}$ is hydrogen or $C_1$–$C_8$alkyl, and
$G^{14}$ is $C_2$–$C_8$alkylene or 1-oxo-$C_2$–$C_8$alkylene; an amine from this class which is of particular technical interest is the compound of the formula (amine G)

compounds of the formula VIIC in which n is 1, G, $G^1$ and $G^{17}$ are hydrogen,
$G^{11}$ is hydrogen or methyl and
$T_1$ and $T_2$ together with the C atom linking them form a $C_5$–$C_{14}$cycloalkane ring; an amine from this class which is of particular technical interest is the compound of the formula

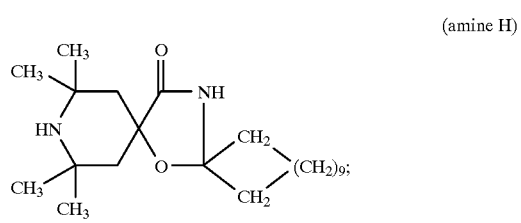

(amine H)

compounds of the formula VIII in which n is 1 or 2,
$G^{18}$ and $G^{19}$ are a group of one of the formulae

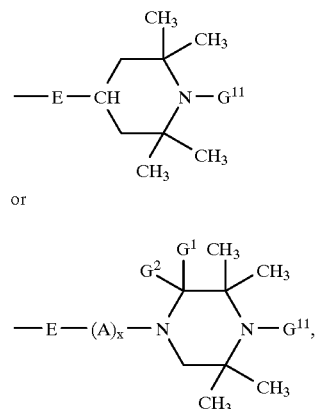

or $G^{11}$ is hydrogen or methyl,
$G^1$ and $G^2$ are hydrogen or together are a substituent =O,
E is —O— or —$NG^{13}$—,
A is $C_2$–$C_6$alkylene, and
x is 0 or 1,
$G^{13}$ is hydrogen, $C_1$–$C_{12}$alkyl or cyclohexyl,
$G^{20}$, in the case where n is 1, is identical to $G^{18}$ and, in the case where n is 2, is a group —E—B—E—, in which B is $C_2$–$C_8$alkylene or $C_2$–$C_8$alkylene which is interrupted by 1 or 2 groups —$N(G^{21})$—,
$G^{21}$ is $C_1$–$C_{12}$alkyl, cyclohexyl, benzyl or $C_1$–$C_4$hydroxyalkyl or a group of the formula

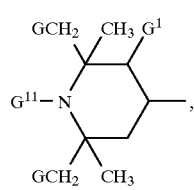

or $G^{21}$ is a group of the formula

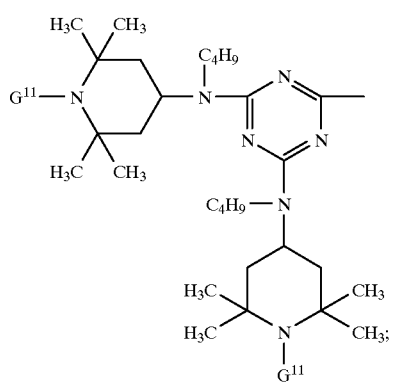

amines from this class which are of particular technical interest are the compound (76) [=amine J] described above and the compound of the formula

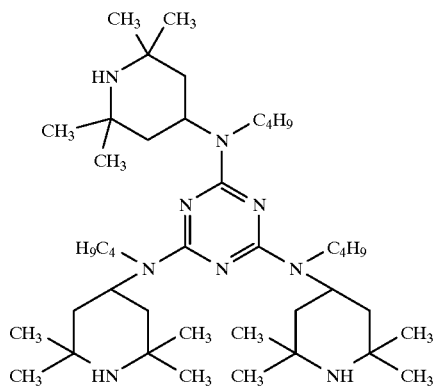

as disclosed in EP-A-107615 (amine K);

compounds of the formula X wherein $G^{11}$ is hydrogen or methyl; and oligomer compounds having 2 to 10 recurring units, such as are obtainable by reaction (i) of

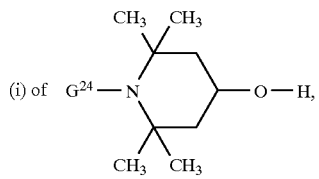

in which $G^4$ is $C_2$–$C_5$hydroxyalkyl, with an aliphatic $C_2$–$C_{12}$dicarboxylic acid or a suitable reactive derivative, such as the diester, dichloride or anhydride;

(j) of a linear oligomer polyester obtained from a dialcohol and butane-1,2,3,4-tetracarboxylic acid with 2,2,6,6-tetramethyl-4-hydroxypiperidine;

(k) of

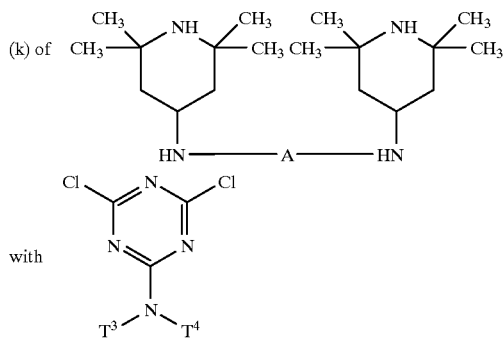

with in which A is $C_2$–$C_6$alkyl, $T^3$ is $C_1$–$C_{18}$alkyl or cyclohexyl, $T^4$ is hydrogen or $C_1$–$C_{18}$alkyl, or $T^3$ and $T^4$ together are $C_4$–$C_6$alkylene or $C_3$–$C_5$oxaalkylene;

(l) of $H_2N$—A—NH—A—$NH_2$ with

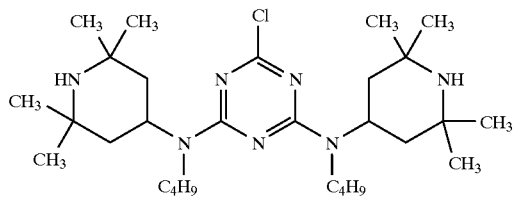

and

Br—A—Br in which A is $C_2$–$C_6$alkylene;

(m) of compounds of the formula

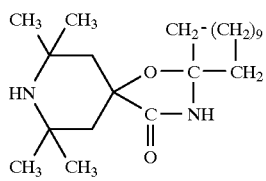

with epichlorohydrin;

(n) of 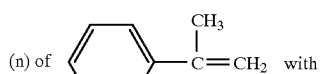 with

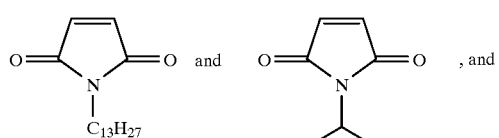, and

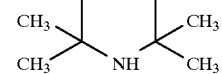

(o) those of the formula

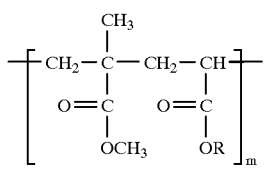

in which about one third of the
radicals R is —C$_2$H$_5$ and the others are

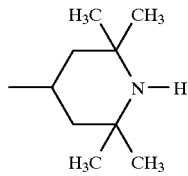

and m is a number from the range 2 to 10.

The oligomer amines are often mixtures of compounds which differ from one another with respect to their chain length.

A preferred class of sterically hindered amines are those containing triazine rings.

Of these classes of sterically hindered amines, amines of particularly high technical interest are those of the following formulae (m again is a number from the range 2 to 10):

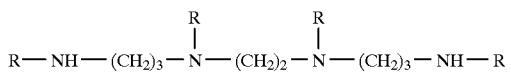

where R is

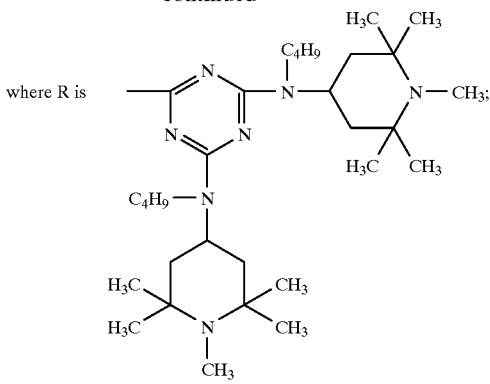

as disclosed in U.S. Pat. No. 4,108,829 and U.S. Pat. No. 4,263,434 (amine J);

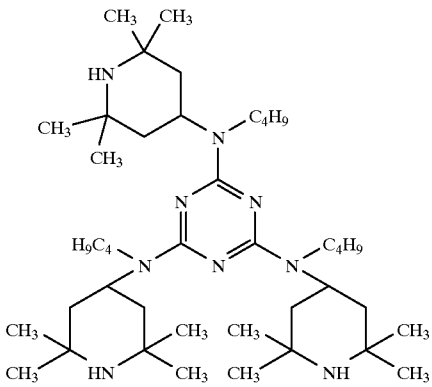

as disclosed in EP-A-107615 (amine K);

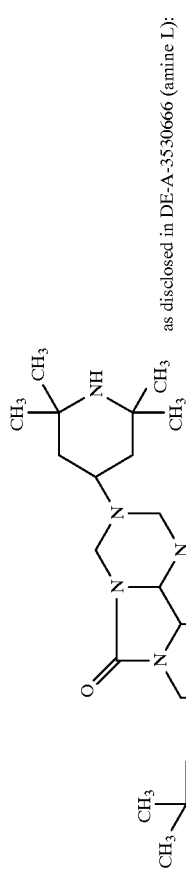
as disclosed in DE-A-3530666 (amine L);
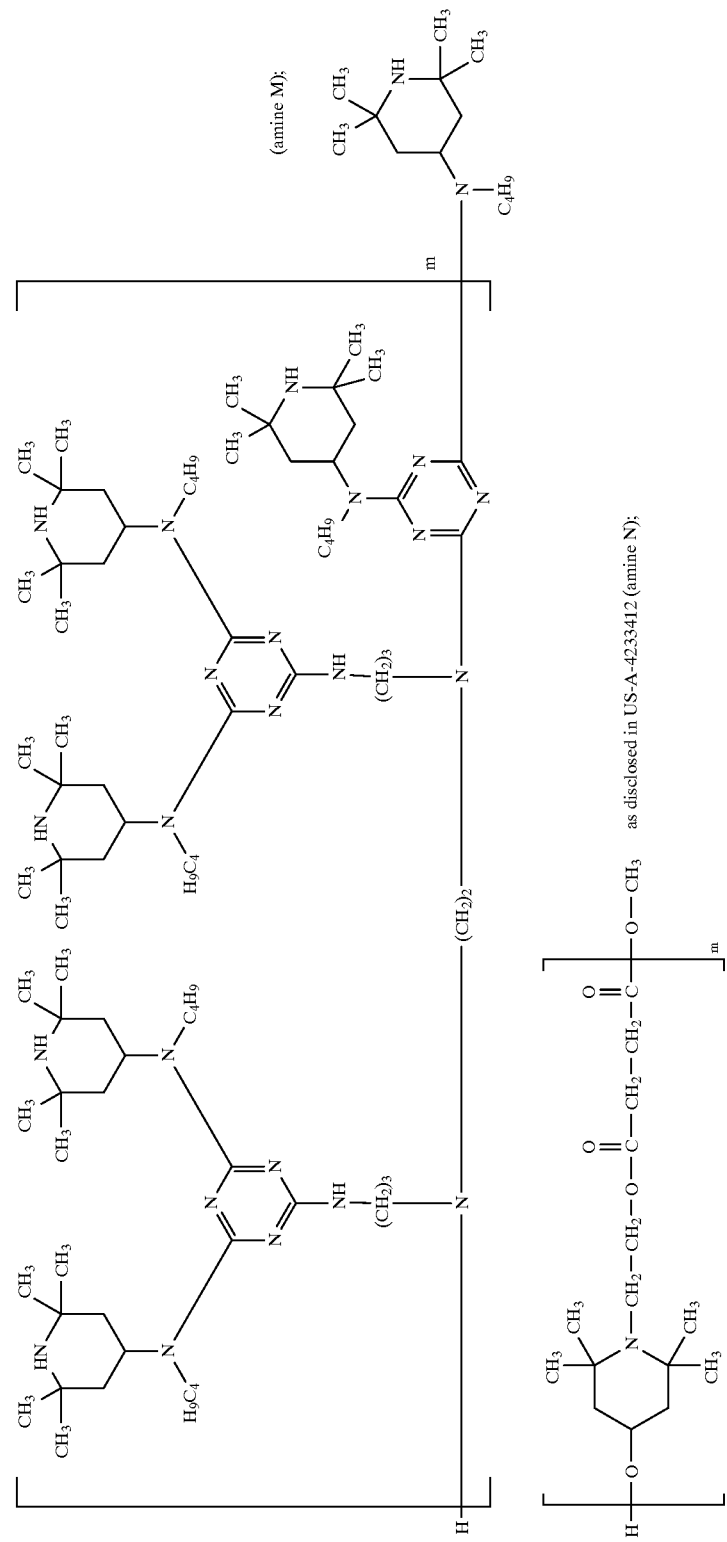
as disclosed in US-A-4233412 (amine N);
(amine M);

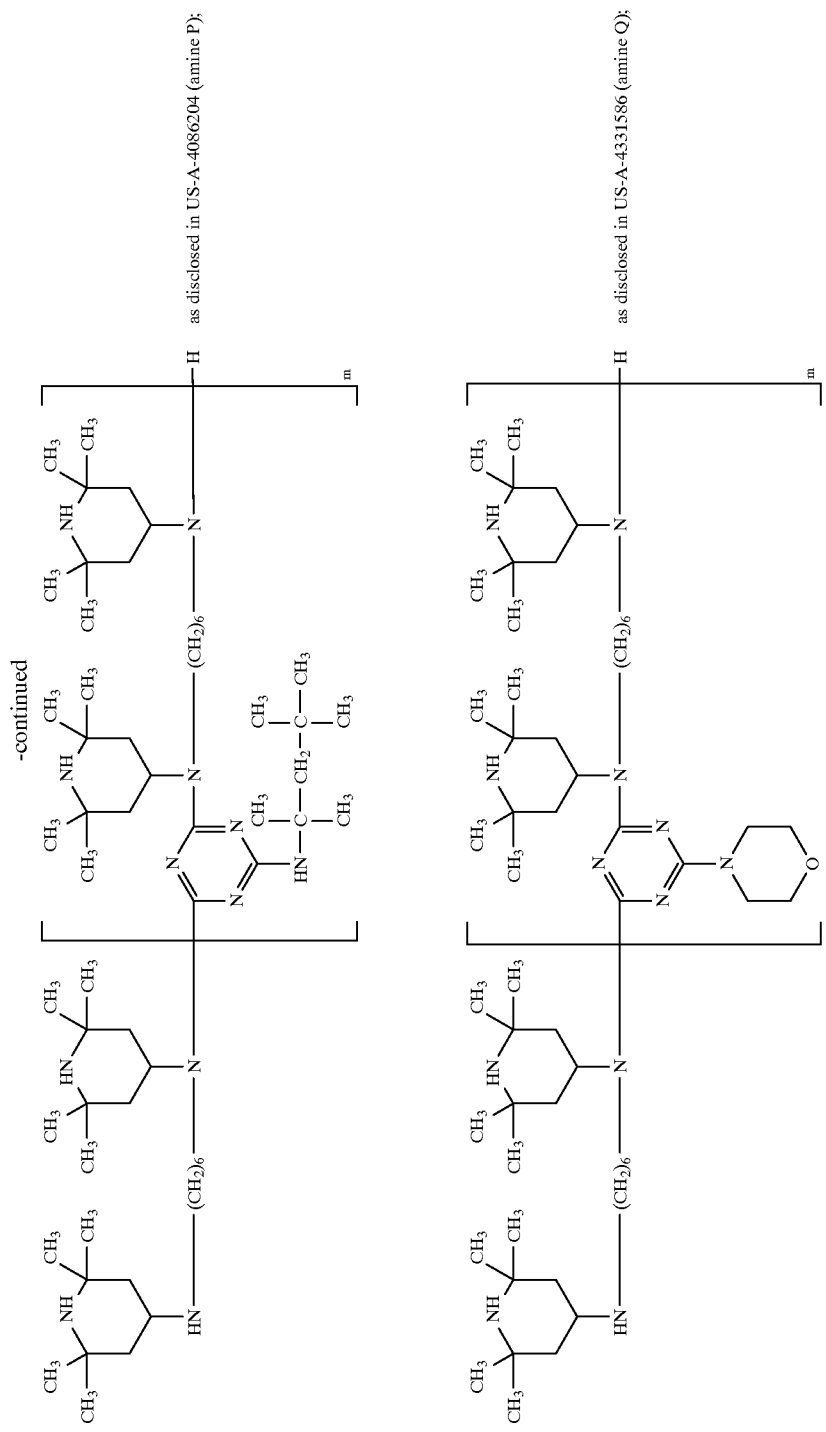

-continued
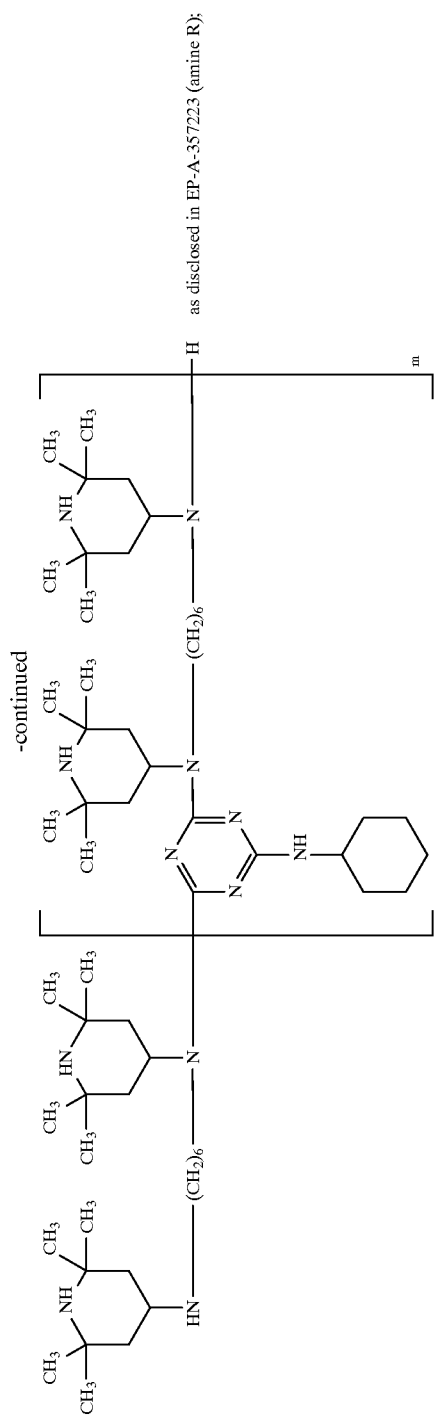
as disclosed in EP-A-357223 (amine R);

the reaction product of $H_2N$—$(CH_2)_2$—$NH$—$(CH_2)_2$—$NH_2$ with

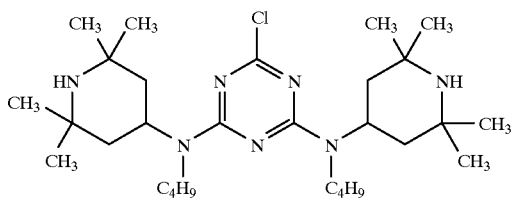

and Br—$(CH_2)_2$—Br (above compound [95]; amine U);

and the reaction product of the compound of the formula

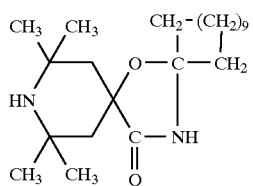

with epichlorohydrin as disclosed in EP-A-402889, having the recurring structural unit

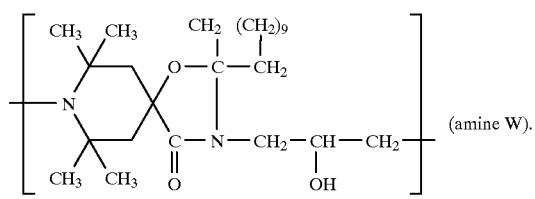

(amine W).

For compositions according to the invention, in particular the addition of those sterically hindered amines is preferred whose molecular weight or average molecular weight is in the range 300 to 10,000, in particular in the range 1000 to 10,000. Of these, those sterically hindered amines whose molecular weight or average molecular weight is in the range 1500 to 10,000, for example in the range 2000 to 7500 may again be mentioned in particular.

All components of the stabilizer composition according to the invention mentioned are known compounds; many of them are commercially available.

Incorporation of the stabilizers into the polyolefin or polyolefin copolymer can be effected by adding the stabilizers according to the invention and, if desired, other additives by the methods conventional in industry. Incorporation can be effected advantageously before or during shaping, for example by mixing the pulverulent components or by adding the stabilizer to the melt or solution of the polymer, or by applying the dissolved or dispersed stabilizers to the polymer, followed if desired by the evaporation of the solvent. A further possibility for incorporating the stabilizers according to the invention into polymers consists in their addition before or during the polymerization of the corresponding monomers or before crosslinking.

The stabilizers according to the invention or mixtures thereof can also be added to the polyolefin or polyolefin copolymer to be stabilized in the form of a masterbatch which contains these stabilizers in, for example, a concentration of from 2.5 to 25% by weight The stabilizers according to the invention are advantageously incorporated by the following possible methods:

as emulsion or dispersion (e.g. to latices or emulsion polymers)

as a dry mixture during the mixing of additional components or polymer mixtures by direct addition to the processing apparatus (e.g. extruder, calender etc.)

as solution or melt.

The resulting stabilized polyolefin or polyolefin copolymer compositions can be converted into films by the conventional methods.

The invention therefore also relates to a process for the stabilization of polyolefin or polyolefin copolymer films for agricultural applications, especially greenhouse applications, this polyolefin or polyolefin copolymer film having improved light stability and pesticide resistance, comprising incorporation of a sterically hindered amine and a metal oxide or hydroxide selected from oxides of zinc, aluminum, calcium and magnesium, and hydroxides of zinc, aluminum and calcium, into the polyolefin or polyolefin copolymer. A further subject of the invention is a greenhouse, characterized in that it is covered by a polyolefin or polyolefin copolymer film having improved light stability and pesticide resistance and stabilized with a sterically hindered amine and a metal oxide or hydroxide selected from oxides of zinc, aluminum, calcium and magnesium, and hydroxides of zinc, aluminum and calcium, and a process for stabilizing a polyolefin or polyolefin copolymer greenhouse film against detrimental effects of pesticides and light, oxygen and/or heat, which process comprises incorporation of a sterically hindered amine and a metal oxide or hydroxide selected from oxides of zinc, aluminum, calcium and magnesium, and hydroxides of zinc, aluminum and calcium, into said greenhouse film.

Further subjects of the invention are the use of a polyolefin or polyolefin copolymer film stabilized with a sterically hindered amine and a metal oxide or hydroxide selected from oxides of zinc, aluminum, calcium and magnesium, and hydroxides of zinc, aluminum and calcium for agricultural applications involving pesticides, especially greenhouse applications, and the use of a sterically hindered amine in combination with a metal oxide or hydroxide selected from oxides of zinc, aluminum, calcium and magnesium, and hydroxides of zinc, aluminum and calcium for the stabilization of polyolefin or polyolefin copolymer films in contact with pesticides against photodegradation and damage by pesticides.

The following examples further illustrate the embodiments of the instant invention. All parts given are by weight unless otherwise noted.

EXAMPLE 1

Greenhouse Application

The compounds reported in table 1 are mixed via master batch with LDPE (polyethylene of low density) pellets (Riblene®2100 V, supplied by ENICHEM, Milano, Italy), characterized by a density of 0.921 g/cm³ and a melt flow index (190° C./2.16 kg) of 0.25, in a slow mixer.

The master batches had previously been prepared by extruding powdered LDPE and 10% by weight of the sterically hindered amine compound A and the relevant concentrations of compounds B (=metal oxide or hydroxide), C (=salt of carboxylic acid) and D (hydrotalcite).

The mixtures are blow extruded at 200° C., and films of 150 microns thickness are obtained.

The films are exposed on the south-facing roof of a greenhouse in Pontecchio Marconi (Bologna, Italy) without backing.

The following pesticides are applied in the greenhouse:

VAPAM® (BASLINI SpA, Treviglio/BG, Italy), which is an aqueous solution of 382 g per liter of metam-sodium having the formula $CH_3-NH-CS-SNa$;

SESMETRIN® (BIMEX SpA, Isola/VI, Italy), which is a 23.75% (% w/w) aqueous solution of permethrin having the formula

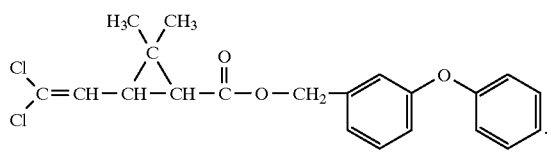

The greenhouse is treated with a solution of 4 liters of VAPAM in 10 liters of water every 6 months, and with SESMETRIN (5 g in 5 liters of water) every month.

During the exposure, the performance is periodically evaluated measuring the residual elongation (in % of the initial elongation of the new polyethylene film) by means of a dynamometer at constant speed.

In table 1, the residual elongation after 16 months of exposure, corresponding to 137 kilolangley (Klys.; energy per unit area), and 22 months (=198 Klys.) of exposure are reported. All concentrations given are by weight of the polymer.

TABLE 1

Residual Elongation (in % of the Initial Elongation) after 16 Months and 22 Months Exposure

| Compound (Concentration) | | | | Residual Elongation after | |
|---|---|---|---|---|---|
| A | B* | C** | D*** | 16 months | 22 months |
| amine P(0.4) | none | none | none | 84% | 16% |
| amine P(0.4) | (0.2) | (0.2) | none | 100% | 69% |
| amine J(0.4) | none | none | none | 64% | 8% |
| amine J(0.4) | (0.2) | (0.2) | none | 88% | 59% |
| amine J(0.4) | (0.2) | (0.2) | (0.5) | 92% | 65% |

*compound B is ZnO
**compound C is calcium stearate
***compound D is a hydrotalcite of formula $Mg_{4.5}Al_2(OH)_{13}\cdot CO_3$ The superiority of films stabilized according to the invention, containing a metal oxide and optional further components is evident.

EXAMPLE 2

Comparison without Application of Pesticides

For the purpose of comparison, further films prepared as in example 1 are exposed on galvanized iron and on pine wood supports without application of pesticides. The film surfaces are fixed in a 45° inclination towards south. Residual elongation is monitored as described in example 1.

Table 2 gives the residual elongation after 34 months of exposure, corresponding to 310 kilolangley (Klys.; energy per unit area). All concentrations given are by weight of the polymer.

TABLE 2

Residual Elongation (in % of the Initial Elongation) after 34 Months Exposure

| Compound (Concentration) | | | Residual Elongation after 34 months | |
|---|---|---|---|---|
| A | B* | C** | Pine Wood | Galvanized Iron |
| amine J(0.4) | none | none | 37% | 42% |
| amine J(0.4) | (0.2) | (0.2) | 51% | 83% |

*compound B is ZnO
**compound C is calcium stearate

A comparison with the data given in example 1, table 1, shows the strong effect of the pesticide treatment in example 1.

EXAMPLE 3

Stabilized LDPE films are manufactured by mixing ground LDPE (RIBLENE®FF 29; ENICHEM, Milano/Italy), characterized by a density of 0.921 g/cm³ and a melt flow index (190° C./2.16 kg) of 0.6, with the compounds reported in tables 3 and 4 in a turbo mixer. Application of pesticides and exposure is as described in example 1.

During the exposure, the performance is periodically evaluated measuring the residual elongation (in % of the initial elongation of the new polyethylene film) by means of a dynamometer at constant speed, and the carbonyl increase with an IR-FT spectrometer (IR Fourier transformation spectrometer by Perkin Elmer).

The results after 14 months of exposure, corresponding to 110 kilolangley, are presented in the following tables 3 and 4.

TABLE 3

Residual Elongation (in % of the Initial Elongation) after 14 Months Exposure

| Compound (Concentration) | | | Residual Elongation after |
|---|---|---|---|
| A | B* | C** | 14 months |
| amine W(0.4) | none | none | 25% |
| amine W(0.4) | (0.2) | (0.2) | 47% |
| amine W(0.8) | none | none | 30% |
| amine W(0.8) | (0.2) | (0.2) | 93% |
| amine N(0.6) | none | none | 13% |
| amine N(0.6) | (0.2) | (0.2) | 39% |

*compound B is ZnO
**compound C is calcium stearate

TABLE 4

Carbonyl Increase after 14 Months Exposure

| Compound (Concentration) | | | | Carbonyl Increase after |
|---|---|---|---|---|
| A | B* | C** | D*** | 14 months |
| amine P(0.4) | none | none | none | 0.46 |
| amine P(0.4) | (0.2) | (0.2) | none | 0.08 |
| amine 3(0.4) | none | none | none | 0.44 |
| amine J(0.4) | (0.2) | (0.2) | none | 0.08 |
| amine J(0.4) | (0.2) | none | none | 0.25 |
| amine J(0.4) | (0.2) | (0.2) | (0.5) | 0.06 |

*compound B is ZnO
**compound C is calcium stearate
***compound D is a hydrotalcite of formula $Mg_{4.5}Al_2(OH)_{13}\cdot CO_3$ It is evident from these results, that the lifetime of the polymer film is tremendously improved when zinc oxide is used as additional stabilizer besides the hindered amine. Further improvements can be achieved by adding a metal carboxylate or a hydrotalcite compound.

EXAMPLE 4

LDPE films stabilized with the compounds reported in table 5 are manufactured from ground LDPE (RIBLENE®FF 29; ENICHEM, Milano/Italy), characterized by a density of 921 g1cm$^3$ and a melt flow index (190° C./2.16 kg) of 0.6, as described in example 1, except that the masterbatches used contain 5% by weight of the hindered amine (compound A) and the corresponding concentrations of compounds B or C (metal oxide) and D (salt of carboxylic acid). Application of pesticides and exposure is as described in example 1.

During the exposure, the performance is periodically evaluated measuring the residual elongation (in % of the initial elongation of the new polyethylene film) by means of a dynamometer at constant speed.

The results are presented in the following table 5.

TABLE 5

Residual Elongation (in % of the Initial Elongation) after Months Exposure (corresponding to kilolangley)

| Compound (Concentration) | | | | Residual Elongation after |
|---|---|---|---|---|
| A | B* | C** | D*** | months |
| amine P(0.4) | none | none | none | |
| amine P(0.4) | (0.2) | none | none | |
| amine P(0.4) | none | (0.2) | none | |
| amine P(0.4) | none | (0.2) | (0.2) | |

*compound B is ZnO
**compound C is MgO
***compound D is calcium stearate

EXAMPLE 5

Stabilized LDPE films are manufactured by mixing ground LDPE (RIBLENE®FF 29; ENICHEM, Milano/Italy), characterized by a density of 0.921 gtcm$^3$ and a melt flow index (190° C./2.16 kg) of 0.6, with the compounds reported in tables 6 and 7 in a turbo mixer. Application of pesticides and exposure is as described in example 1.

During the exposure, the performance is periodically evaluated measuring the residual elongation (in % of the initial elongation of the new polyethylene film) by means of a dynamometer at constant speed, and the carbonyl increase with an IR-FT spectrometer (IR Fourier transformation spectrometer by Perkin Elmer).

The results after months of exposure, corresponding to kilolangley, are presented in the following tables 6 and 7.

TABLE 6

Residual Elongation (in % of the Initial Elongation) after Months Exposure

| Compound (Concentration) | | | | Residual Elongation after |
|---|---|---|---|---|
| A | B* | C** | D*** | months |
| amine M(0.4) | none | none | none | |
| amine M(0.4) | (0.2) | (0.2) | none | |
| amine Q(0.4) | none | none | none | |
| amine Q(0.4) | (0.2) | (0.2) | none | |
| amine P(0.4) | none | none | none | |

TABLE 6-continued

Residual Elongation (in % of the Initial Elongation) after Months Exposure

| Compound (Concentration) | | | | Residual Elongation after |
|---|---|---|---|---|
| A | B* | C** | D*** | months |
| amine P(0.4) | (0.2) | (0.2) | none | |
| amine J(0.4) | none | none | none | |
| amine J(0.4) | (0.2) | (0.2) | none | |
| amine J(0.4) | (0.2) | none | none | |
| amine J(0.4) | (0.4) | none | none | |
| amine J(0.4) | (0.2) | (0.2) | (0.5) | |

*compound B is ZnO
**compound C is calcium stearate
***compound D is a hydrotalcite of formula $Mg_{4.5}Al_2(OH)_{13}.CO_3$

TABLE 7

Carbonyl Increase after Months Exposure

| Compound (Concentration) | | | | Carbonyl Increase after |
|---|---|---|---|---|
| A | B* | C** | D*** | months |
| amine W(0.4) | none | none | none | |
| amine W(0.4) | (0.2) | (0.2) | none | |
| amine W(0.8) | none | none | none | |
| amine W(0.8) | (0.2) | (0.2) | none | |
| amine N(0.6) | none | none | none | |
| amine N(0.6) | (0.2) | (0.2) | none | |
| amine M(0.4) | none | none | none | |
| amine M(0.4) | (0.2) | (0.2) | none | |
| amine Q(0.4) | none | none | none | |
| amine Q(0.4) | (0.2) | (0.2) | none | |
| amine P(0.4) | none | none | none | |
| amine P(0.4) | (0.2) | (0.2) | none | |
| amine J(0.4) | none | none | none | |
| amine J(0.4) | (0.2) | (0.2) | none | |
| amine J(0.4) | (0.2) | none | none | |
| amine J(0.4) | (0.4) | none | none | |
| amine J(0.4) | (0.2) | (0.2) | (0.5) | |

*compound B is ZnO
**compound C is calcium stearate
***compound D is a hydrotalcite of formula $Mg_{4.5}Al_2(OH)_{13}.CO_3$

What is claimed is:

1. A polyolefin or polyolefin copolymer film in contact with a pesticide and stabilized against photodegradation, said polyolefin or polyolefin copolymer film having improved light stability and pesticide resistance, characterized in that the polyolefin or polyolefin copolymer contains a sterically hindered amine and a metal oxide or hydroxide selected from oxides of zinc, aluminum, calcium and magnesium, and hydroxides of zinc, aluminum and calcium.

2. A polyolefin or polyolefin copolymer film according to claim 1, in which the pesticide contains halogen and/or sulfur atoms.

3. A polyolefin or polyolefin copolymer film according to claim 1, in which the polyolefin or polyolefin copolymer is polyethylene, ethylene/propylene copolymer, ethylene/vinyl acetate copolymer or polypropylene.

4. A polyolefin or polyolefin copolymer film according to claim 1, in which the sterically hindered amine is a cyclic sterically hindered amine containing at least one group of the formula III

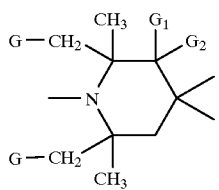

(III)

in which G is hydrogen or methyl and $G^1$ and $G^2$ are hydrogen, methyl or together are =O.

5. A polyolefin or polyolefin copolymer film according to claim 1, in which the metal oxide or hydroxide is selected from zinc oxide, zinc hydroxide and magnesium oxide.

6. A polyolefin or polyolefin copolymer film according to claim 1, in which the polyolefin or polyolefin copolymer contains from 0.005 to 3% by weight of the metal oxide or hydroxide and from 0.01 to 5% by weight of the sterically hindered amine, relative to the weight of the polyolefin or polyolefin copolymer.

7. A polyolefin or polyolefin copolymer film according to claim 1, in which the polyolefin or polyolefin copolymer contains one or more further components selected from alkaline earth metal salts, zinc salts and aluminum salts of $C_1$–$C_{30}$carboxylic acid, hydrotalcites, and UV absorbers.

8. A polyolefin or polyolefin copolymer film according to claim 7, in which the polyolefin or polyolefin copolymer contains a 2-(2'-hydroxyphenyl)-benzotriazole UV absorber.

9. A polyolefin or polyolefin copolymer film according to claim 7, in which the polyolefin or polyolefin copolymer contains a salt of a $C_{12}$–$C_{18}$carboxylic acid with aluminum, calcium, magnesium or zinc.

10. A polyolefin or polyolefin copolymer film according to claim 7, in which the polyolefin or polyolefin copolymer contains as further component a hydrotalcite.

11. A greenhouse, characterized in that it is covered by a polyolefin or polyolefin copolymer film having improved light stability and pesticide resistance and stabilized with a sterically hindered amine and a metal oxide or hydroxide selected from oxides of zinc, aluminum, calcium and magnesium, and hydroxides of zinc, aluminum and calcium.

12. A process for stabilizing a polyolefin or polyolefin copolymer greenhouse film against detrimental effects of pesticides and light, oxygen and/or heat, which process comprises incorporation of are effective stabilizing amount of a sterically hindered amine and a metal oxide or hydroxide selected from oxides of zinc, aluminum, calcium and magnesium, and hydroxides of zinc, aluminum and calcium, into said greenhouse film.

* * * * *